United States Patent
Horton et al.

(10) Patent No.: US 12,293,390 B2
(45) Date of Patent: ***May 6, 2025

(54) METHOD AND COMPUTING DEVICE FOR PERFORMING DYNAMIC DIGITAL SIGNAGE CAMPAIGN OPTIMIZATION

(71) Applicant: BROADSIGN SERV INC., St. Louis, MO (US)

(72) Inventors: Daniel Horton, Blainville (CA); Bryan Mongeau, Beaconsfield (CA)

(73) Assignee: BROADSIGN SERV INC., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,183

(22) Filed: Aug. 23, 2023

(65) Prior Publication Data

US 2023/0394534 A1 Dec. 7, 2023

Related U.S. Application Data

(63) Continuation of application No. 17/581,293, filed on Jan. 21, 2022, now Pat. No. 11,783,379.
(Continued)

(51) Int. Cl.
*G06Q 30/02* (2023.01)
*G06Q 30/0241* (2023.01)

(52) U.S. Cl.
CPC ................ *G06Q 30/0276* (2013.01)

(58) Field of Classification Search
CPC .......... G06Q 30/0276; G06Q 30/0254; G06Q 30/0264; G06Q 30/0272; G06Q 30/0244
See application file for complete search history.

(56) References Cited

U.S. PATENT DOCUMENTS

| | | |
|---|---|---|
| 8,170,913 B1 | 5/2012 | Baluja |
| 10,701,423 B2 | 6/2020 | Chaar et al. |

(Continued)

FOREIGN PATENT DOCUMENTS

WO 2009152466 A2 12/2009

OTHER PUBLICATIONS

University of Chicago, "Measuring Performance and Network Utilization of Popular Video Conferenceing Applications" (Year: 2021).*
(Continued)

*Primary Examiner* — Breffni Baggot
(74) *Attorney, Agent, or Firm* — Buchanan Ingersoll & Rooney PC

(57) ABSTRACT

Method and computing device for performing dynamic digital signage campaign optimization. Screen data associated to screens controlled by the computing device and requirements of active campaigns are stored at the computing device. The screen data comprise characteristics of the screens and screen activity data defining the activity the screens for the active campaigns. The computing device receives requirements of a candidate campaign and generates a mathematical model based on the requirements of the candidate campaign, the requirements of the active campaigns, and at least some of the screen data. The mathematical model is transmitted to a mathematical solver and a mathematical solution generated by the mathematical solver is received. The computing devices generates configuration data for the candidate campaign based on the mathematical solution. The configuration data define a configuration for displaying a content of the candidate campaign on selected screens among the screens controlled by the computing device.

20 Claims, 22 Drawing Sheets

Related U.S. Application Data

(60) Provisional application No. 63/285,671, filed on Dec. 3, 2021.

(56) References Cited

U.S. PATENT DOCUMENTS

| | | |
|---|---|---|
| 2004/0181441 A1 | 9/2004 | Fung et al. |
| 2005/0039206 A1 | 2/2005 | Opdycke |
| 2006/0149604 A1 | 7/2006 | Miller |
| 2006/0287913 A1* | 12/2006 | Baluja .................. G06Q 30/02 705/14.54 |
| 2007/0192189 A1 | 8/2007 | Popowich et al. |
| 2008/0306804 A1 | 12/2008 | Opdycke et al. |
| 2009/0030788 A1 | 1/2009 | Boudah et al. |
| 2010/0100414 A1 | 4/2010 | Lin et al. |
| 2010/0332311 A1 | 12/2010 | Jilk |
| 2012/0089455 A1 | 4/2012 | Belani et al. |
| 2013/0013396 A1 | 1/2013 | Vinson et al. |
| 2013/0054349 A1 | 2/2013 | Ogawa |
| 2013/0205339 A1 | 8/2013 | Haberman et al. |
| 2013/0268352 A1 | 10/2013 | Baluja |
| 2014/0195339 A1* | 7/2014 | Paulsen .............. G06Q 30/0247 705/14.46 |
| 2015/0186928 A1 | 7/2015 | Chittilappilly et al. |
| 2015/0373387 A1 | 12/2015 | Chaar et al. |
| 2016/0292744 A1 | 10/2016 | Strimaitis et al. |
| 2017/0193547 A1 | 7/2017 | Berrett et al. |
| 2018/0091850 A1 | 3/2018 | Sandholm |
| 2020/0245035 A1 | 7/2020 | Sandholm et al. |
| 2020/0288215 A1 | 9/2020 | Ray et al. |
| 2020/0364755 A1 | 11/2020 | Ferris et al. |
| 2020/0404391 A1 | 12/2020 | Haberman et al. |
| 2021/0097576 A1 | 4/2021 | LeFlohic et al. |
| 2021/0105541 A1 | 4/2021 | Ray et al. |

OTHER PUBLICATIONS

University of Chicago "Too Many Metrics" (Year: 2016).*
Kuçukaydin, H., Selçuk, B., & Ozluk, O. (2020). "Optimal keyword bidding in search-based advertising with budget constraint and stochastic ad position." Journal of the Operational Research Society, 7(14), 565-578 (Year: 2020), 5 pages.
Extended European Search Report for European Application No. 22211096.7, dated Mar. 20, 2023, 9 pages.
Entire prosecution history of U.S. Appl. No. 17/581,293, filed Jan. 21, 2022.

* cited by examiner

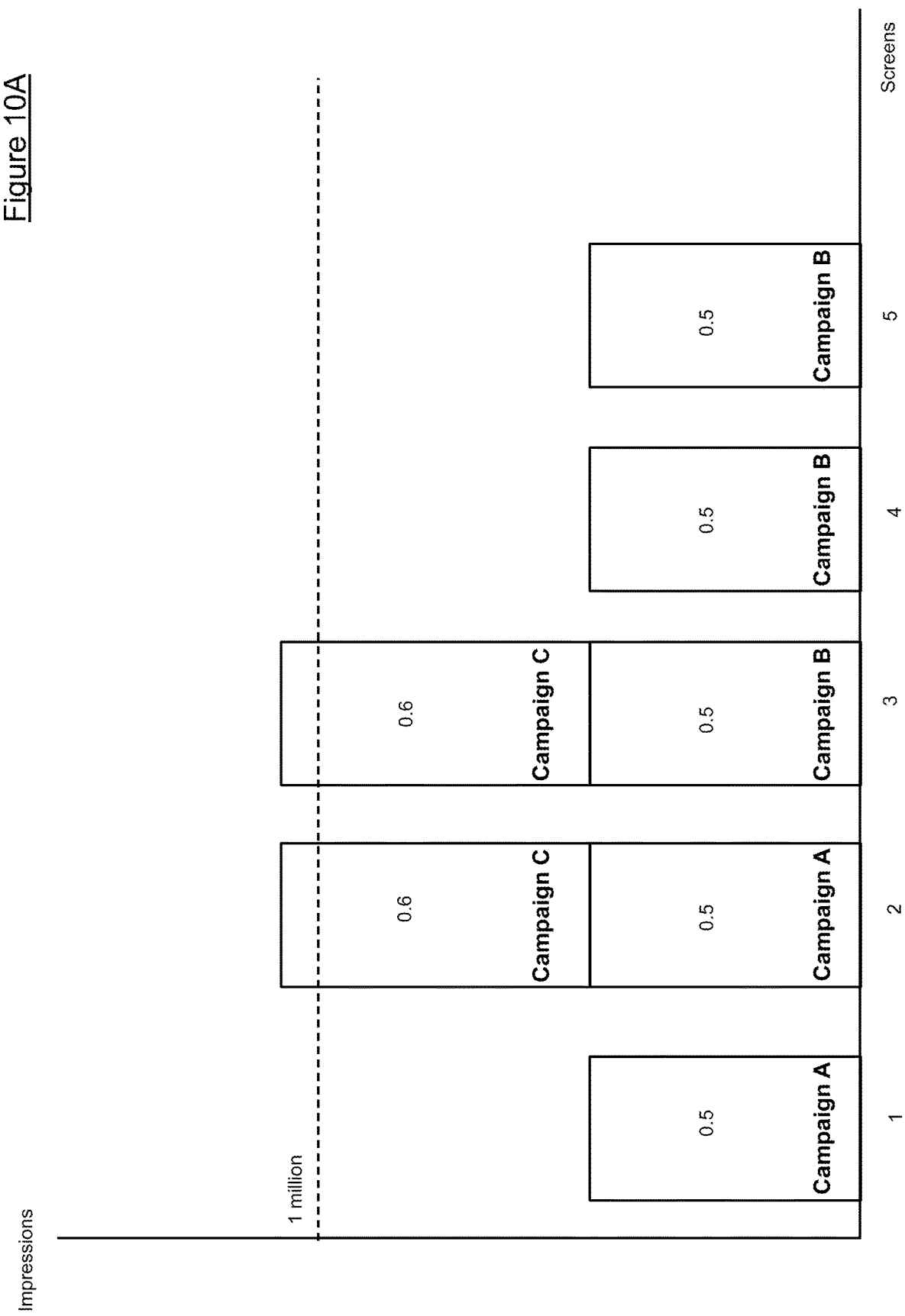

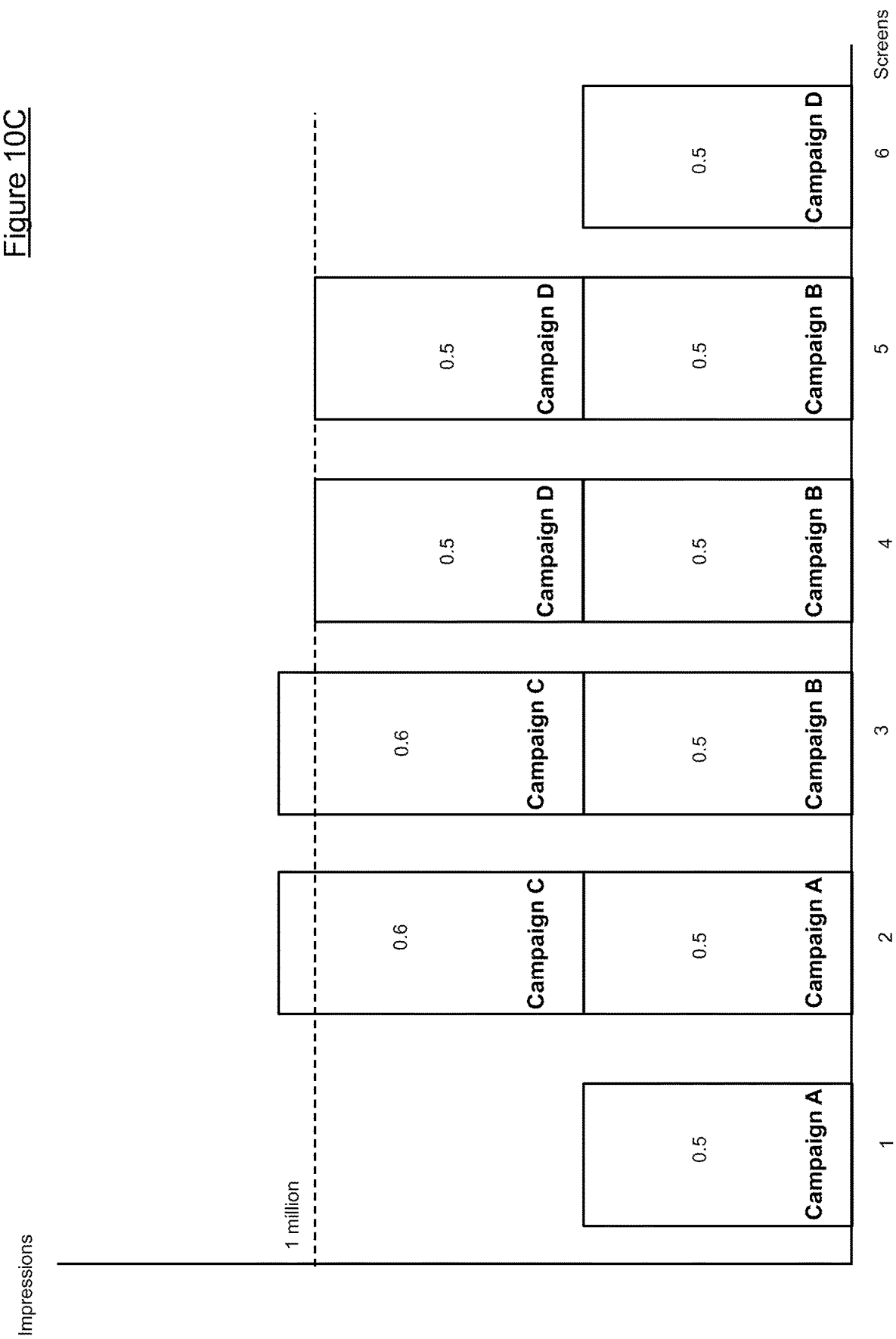

Figure 12A

| Screen location | Monday | Tuesday | Wednesday | Thursday | Friday |
|---|---|---|---|---|---|
| NY Street | Campaign A | Campaign A | Campaign A | Campaign A | Campaign A |
| NY Mall | Campaign A | Campaign A | Campaign A | Campaign A | Campaign A |
| NY Café | | | | | |
| BOS Café | Campaign B | Campaign B | Campaign B | Campaign B | Campaign B |
| BOS Mall | Campaign B | Campaign B | Campaign B | Campaign B | Campaign B |
| BOS Park | | | | | |

Days

Figure 12B

| Screen location | Monday | Tuesday | Wednesday | Thursday | Friday |
|---|---|---|---|---|---|
| NY Street | Campaign A | Campaign A | Campaign A | Campaign A | Campaign A |
| NY Mall | Campaign A | Campaign A | Campaign A | Campaign A | Campaign A |
| NY Café | | Campaign C | Campaign C | | |
| BOS Café | Campaign B | Campaign C | Campaign C | Campaign B | Campaign B |
| BOS Mall | Campaign B | Campaign B | Campaign B | Campaign B | Campaign B |
| BOS Park | | Campaign B | Campaign B | | |

Days

Figure 12C

| Screen location | Monday | Tuesday | Wednesday | Thursday | Friday |
|---|---|---|---|---|---|
| NY Street | Campaign A | Campaign A | Campaign A | Campaign A | Campaign A |
| NY Mall | Campaign A | Campaign A | Campaign A | Campaign D | Campaign D |
| NY Café | | Campaign C | Campaign C | Campaign A | Campaign A |
| BOS Café | Campaign B | Campaign C | Campaign C | Campaign B | Campaign B |
| BOS Mall | Campaign B | Campaign B | Campaign B | Campaign D | Campaign D |
| BOS Park | | Campaign B | Campaign B | Campaign B | Campaign B |

Days

METHOD AND COMPUTING DEVICE FOR PERFORMING DYNAMIC DIGITAL SIGNAGE CAMPAIGN OPTIMIZATION

CROSS-REFERENCE TO RELATED APPLICATIONS

This Application is a Continuation of U.S. patent application Ser. No. 17/581,293, filed Jan. 21, 2022, titled "METHOD AND COMPUTING DEVICE FOR PERFORMING DYNAMIC DIGITAL SIGNAGE CAMPAIGN OPTIMIZATION," the disclosure of which is incorporated herein by reference in its entirety for all purposes. U.S. patent application Ser. No. 17/581,293 claims priority to U.S. Provisional Patent Application No. 63/285,671, filed Dec. 3, 2021, titled "METHOD AND COMPUTING DEVICE FOR PERFORMING DYNAMIC DIGITAL SIGNAGE CAMPAIGN OPTIMIZATION," the disclosure of which is incorporated herein by reference in its entirety for all purposes.

TECHNICAL FIELD

The present disclosure relates to the field of digital signage. More specifically, the present disclosure presents a method and computing device for performing dynamic digital signage campaign optimization.

BACKGROUND

Signage refers to graphic designs, such as symbols, emblems, words, images, etc. In advertising, signage refers to the design or use of images, signs and symbols to communicate a message to a specific group, usually for the purpose of marketing. Digital signage is a sub segment of signage and comprises the use of digital signage display units also referred to as digital signage players. Digital signage players include liquid-crystal displays (LCDs), light-emitting diode (LED) displays, projector screens, etc. A digital signage player displays a succession of digital signage contents, such as still images, videos, etc. Digital signage is a field in great expansion especially for advertising in public venues (e.g. an airport, a shopping mall, etc.), because of the potential to advertise dynamically, such as is done with an advertising video.

A centralized management platform is generally in charge of deploying and managing digital signage campaigns on a plurality of digital signage players directly or indirectly (via digital signage servers) under its control. The centralized management platform interacts with customer's devices, to receive requirements for the campaigns. The requirements are usually categorized into two categories: campaign goals (e.g. a target number of impressions, a target number of plays, etc.) and campaign constraints (e.g. location of the screens, time periods of display, etc.). The centralized management platform also maintains configuration data about the currently active campaigns. When a new candidate campaign is submitted to the management platform, the management platform determines if the new candidate campaign can be deployed, taking into account the requirements of the candidate campaign and the configuration data of the active campaigns.

The determination is generally made by a proprietary software, referred to as an availability engine. The proprietary software is able to support pre-defined use cases; and it is usually difficult to adapt the proprietary software to support new use cases. Furthermore, legacy availability engines are generally not capable of automatically adjusting configuration data of active campaigns to accommodate the candidate campaign. The adjustments to the configuration data of the active campaigns (e.g. partial rescheduling, cancellation, etc.) are performed manually, by a user of the management platform.

Therefore, there is a need for a new a method and computing device for performing dynamic digital signage campaign optimization.

SUMMARY

According to a first aspect, the present disclosure provides a method for performing dynamic digital signage campaign optimization. The method comprises storing in a memory of a management platform screen data associated to a plurality of screens under the control of the management platform. The screen data comprise screen characteristic data defining characteristics of each screen under the control of the management platform. The screen data further comprise screen activity data defining the activity of each screen for at least one active digital signage campaign. The method comprises storing in the memory of the management platform requirements of the at least one active campaign. The method comprises receiving by a processing unit of the management platform requirements of a candidate digital signage campaign. The method comprises generating by the processing unit of the management platform a mathematical model based on the requirements of the candidate campaign, the requirements of the at least one active campaign, and at least some of the screen data. The method comprises transmitting the mathematical model to a mathematical solver. The method comprises receiving a mathematical solution generated by the mathematical solver from the mathematical solver. The method comprises generating by the processing unit of the management platform configuration data for the candidate campaign based on the mathematical solution. The configuration data define a configuration for displaying a content of the candidate campaign on selected screens among the plurality of screens under the control of the management platform.

According to a second aspect, the present disclosure provides a non-transitory computer-readable medium storing instructions. The instructions, when executed by a processing unit of a computing device, provide for performing dynamic digital signage campaign optimization according to the aforementioned method.

According to a third aspect, the present disclosure provides a computing device for performing dynamic digital signage campaign optimization. The computing device comprises at least one communication interface, memory and a processing unit. The processing unit stores in the memory screen data associated to a plurality of screens under the control of the computing device. The screen data comprise screen characteristic data defining characteristics of each screen under the control of the computing device. The screen data further comprise screen activity data defining the activity of each screen for at least one active digital signage campaign. The processing unit stores in the memory requirements of the at least one active campaign. The processing unit receives via the at least one communication interface requirements of a candidate digital signage campaign. The processing unit generates a mathematical model based on the requirements of the candidate campaign, the requirements of the at least one active campaign, and at least some of the screen data. The processing unit transmits via the at least one communication interface the mathematical model to a computational server executing a mathematical solver. The processing unit receives via the at least one communication interface a mathematical solution generated by the mathematical solver from the computational server. The processing unit generates configuration data for the candidate campaign based on the mathematical solution. The configuration data define a configuration for displaying a content of the candidate campaign on selected screens among the plurality of screens under the control of the computing device.

BRIEF DESCRIPTION OF THE DRAWINGS

Embodiments of the disclosure will be described by way of example only with reference to the accompanying drawings, in which:

FIGS. 10A, 10B, 10C and 10D illustrate a dynamic campaign admission functionality.

FIGS. 12A, 12B and 12C illustrate a dynamic screen selection functionality.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the dynamic adjustment of active digital signage campaigns in order to enable the deployment of a new campaign in accordance with the requirements of the active campaigns and the new campaign. The requirements usually comprise a combination of goal(s) and constraint(s). For this purpose, a mathematical model is generated based on the requirements of the new campaign and the requirements of the active campaigns, as well as screen activity data of the active campaigns. A mathematical solver processes the mathematical model to determine an optimal mathematical solution, the mathematical solution being translated back into configuration data for the new campaign and in some cases in reconfiguration data for at least one of the active campaigns.

Figure 1:
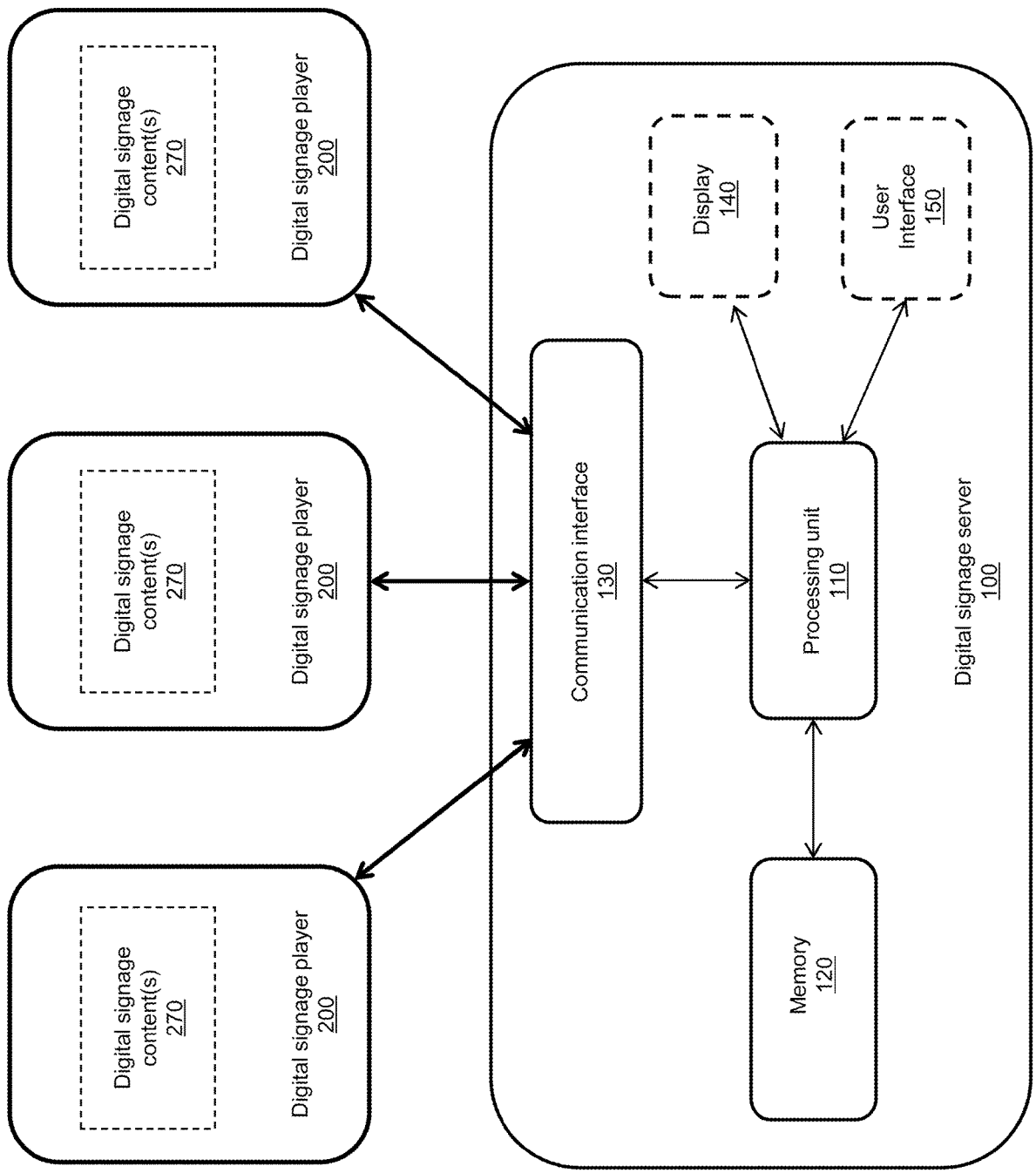
FIG. 1 represents a digital signage server interacting with a plurality of digital signage players.
Figure 2:
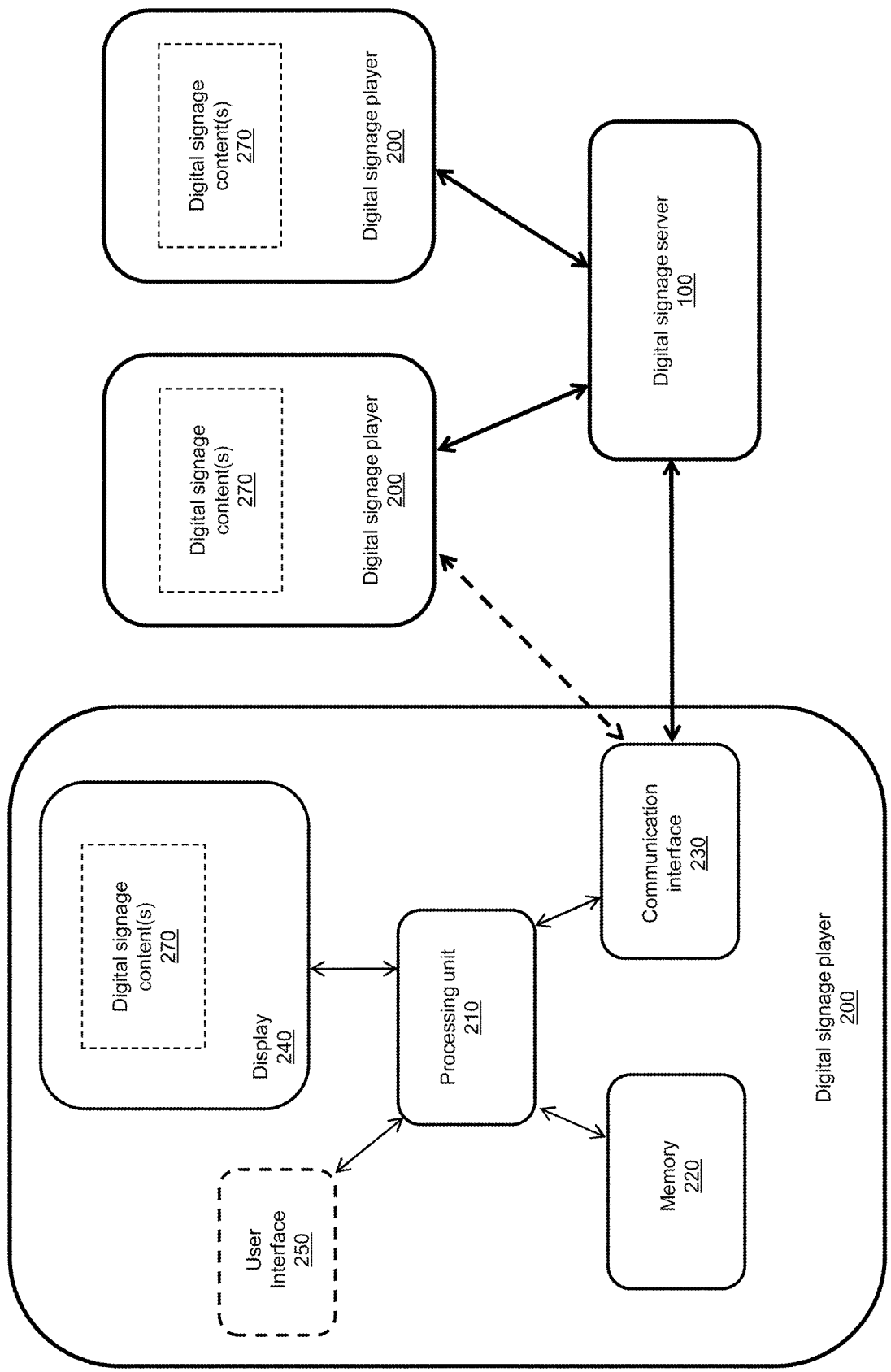
FIG. 2 represents details of one of the digital signage players of FIG. 1.

Referring now concurrently to FIGS. 1 and 2, a digital signage server 100 and a plurality of digital signage players 200 are represented.

Referring more particularly to FIG. 1, details of the digital signage server 100 are illustrated.

For the purpose of clarity, only a single digital signage server 100 is represented in FIG. 1, but the digital signage server 100 may consist of a cluster of generic purpose computers or a cluster of high-performance specialized computers.

The digital signage server 100 comprises a processing unit 110. The processing unit 110 comprises one or more processor (not represented in FIG. 1 for simplification purposes) capable of executing instructions of computer program(s) for implementing functionalities of the digital signage server 100 (e.g. receiving data, processing the received data, generating data, transmitting the generated data, etc.). Each processor may further have one or more core.

The digital signage server 100 comprises memory 120. The memory 120 stores instructions of the computer program(s) executed by the processing unit 110, data generated by the execution of the computer program(s), data received via a communication interface 130, etc. The digital signage server 100 may comprise several types of memories, including volatile memory (e.g. volatile Random Access Memory (RAM), etc.) and non-volatile memory (e.g. a hard drive, electrically-erasable programmable read-only memory (EEPROM), flash, etc.).

The digital signage server 100 comprises the communication interface 130. The communication interface 130 allows the digital signage server 100 to exchange data with the digital signage players 200, and with other computing devices if needed. The communication interface 130 supports one of the following communication technologies: fixed broadband, Ethernet, cellular (e.g. a 4G or 5G cellular network), Wi-Fi, wireless mesh, Bluetooth®, Bluetooth® Low Energy (BLE), etc. For example, the digital signage server 100 communicates with the digital signage players 200 via a cellular network or a fixed broadband network. Although a single communication interface 130 is represented in FIG. 1, the digital signage server 100 may include several communication interfaces 130, each communication interface 130 supporting a given communication technology for exchanging data with computing devices also supporting the given communication technology.

Optionally, the digital signage server 100 also comprises a display 140 (e.g. a standard screen, a touchscreen, etc.) and/or a user interface 150 (e.g. a keyboard, a mouse, a touchscreen, etc.).

Referring more particularly to FIG. 2, details of one of the digital signage players 200 are illustrated.

The digital signage player 200 comprises a processing unit 210. The processing unit 210 comprises one or more processor (not represented in FIG. 2 for simplification purposes) capable of executing instructions of computer program(s) for implementing functionalities of the digital signage player 200 (e.g. receiving data, processing the received data, generating data, transmitting the generated data, etc.). Each processor may further have one or more core.

The digital signage player 200 comprises memory 220. The memory 220 stores instructions of the computer program(s) executed by the processing unit 210, data generated by the execution of the computer program(s), data received via a communication interface 230, etc. The digital signage player 200 may comprise several types of memories, including volatile memory (e.g. volatile Random Access Memory (RAM), etc.) and non-volatile memory (e.g. a hard drive, electrically-erasable programmable read-only memory (EEPROM), flash, etc.).

The digital signage player 200 comprises the communication interface 230. The communication interface 230 allows the digital signage player 200 to exchange data with the digital signage server 100, and with other computing devices (e.g. with other digital signage players 200). The communication interface 230 supports one of the following communication technologies: fixed broadband, Ethernet, cellular (e.g. a 4G or 5G cellular network), Wi-Fi, wireless mesh, Bluetooth®, Bluetooth® Low Energy (BLE), etc. Although a single communication interface 230 is represented in FIG. 2, the digital signage player 200 may include several communication interfaces 230, each communication interface 230 supporting a given communication technology for exchanging data with computing devices also supporting the given communication technology.

Figure 3:
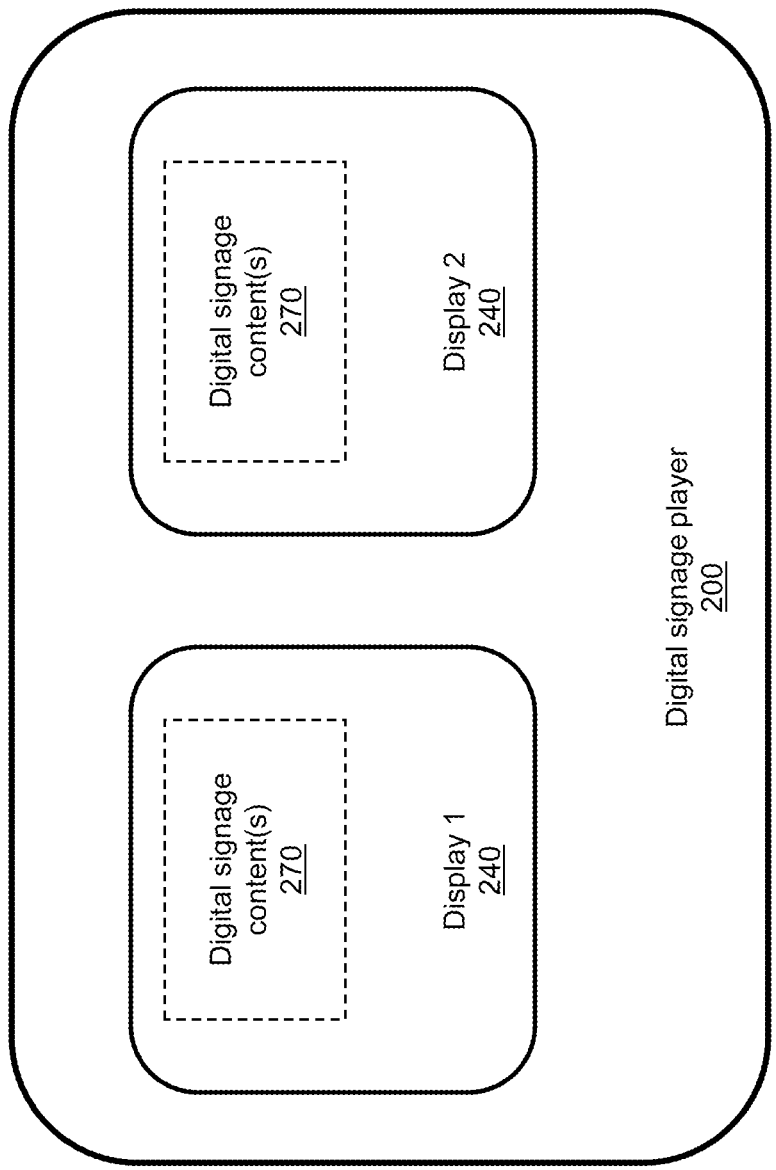
FIG. 3 represents one of the digital signage players of FIG. 2 comprising two displays.

The digital signage player 200 comprises a display 240. A single display 240 is represented in FIG. 2. However, the digital signage player 200 may comprise several displays 240, as illustrated in FIG. 3. The one or more display 240 consists of, without limitations, a liquid-crystal display (LCD), a light-emitting diode (LED) display, an organic light-emitting diode (OLED) display, a projector screen, a combination thereof, etc. The one or more display 240 may have a large screen, to be visible by a large crowd. The digital signage player 200 is usually located in a public venue (e.g. an airport, a shopping mall, a street, etc.), so that a large number of persons located close to the digital signage player 200 can see a content displayed on its display 240. The display 240 displays one or more digital signage content 270. If the digital signage player 200 comprises several displays 240 (as illustrated in FIG. 3), each display 240 of the digital signage player 200 displays the same digital signage content(s) 270, at least partially different digital signage content(s) 270 or different digital signage content(s) 270. Optionally, the digital signage player 200 also comprises a user interface 250 (e.g. a keyboard, a mouse, a touchscreen, etc.).

FIG. 3 illustrates a digital signage player 200 with two displays 240: display 1 and display 2. As mentioned previously, the same digital signage content(s) 270 is displayed on displays 1 and 2. Alternatively, totally different digital signage content(s) 270 is displayed on displays 1 and 2. Alternatively, partially similar and partially different digital signage content(s) 270 is displayed on displays 1 and 2. The number of displays 240 of a given digital signage player 200 is not limited to two, and could be greater than two.

Figure 4:
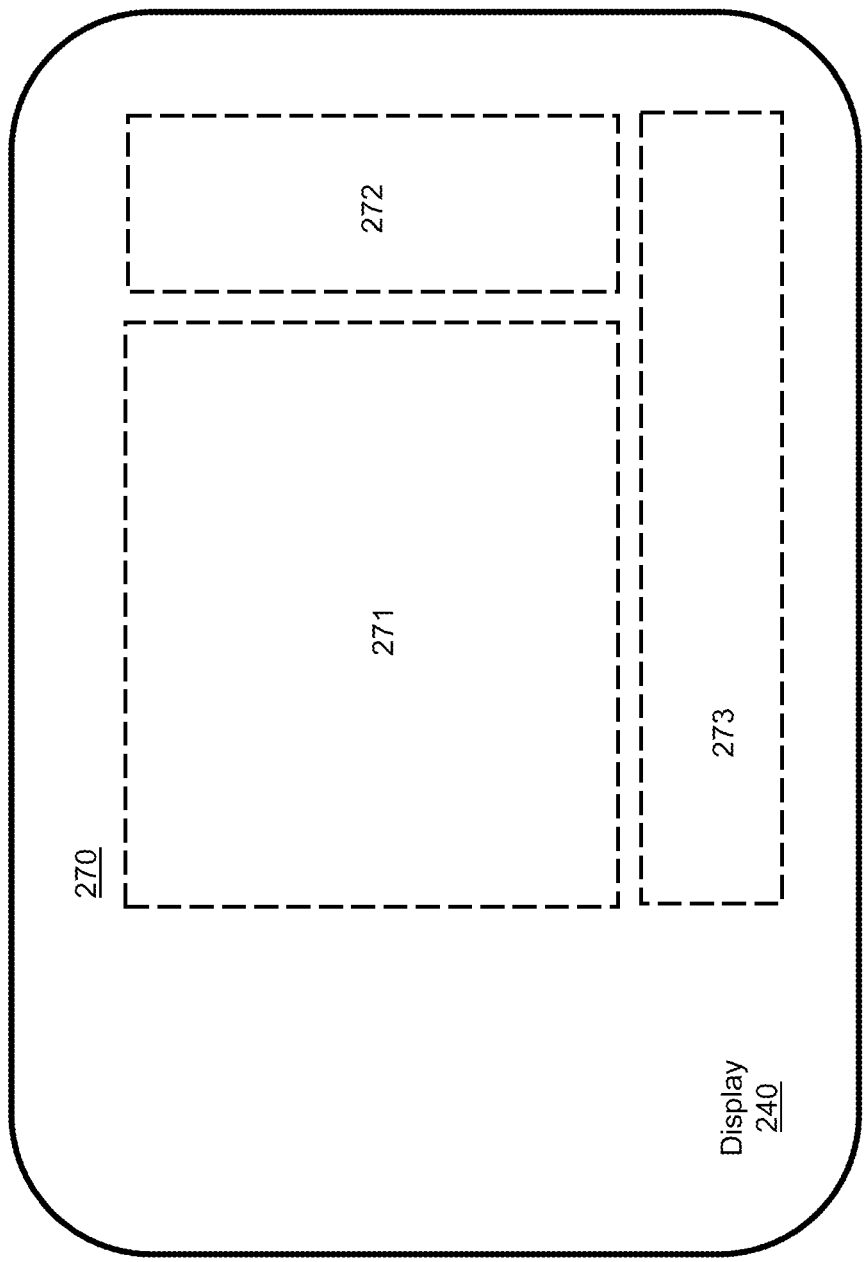
FIG. 4 represents exemplary digital signage contents displayed by one of the digital signage players of FIG. 2.

FIG. 4 illustrates a display 240 of one of the digital signage players 200 of FIG. 2 displaying a plurality of digital signage contents 270 simultaneously. For example, a first digital signage content 271 comprises a larger video image, a second digital signage content 272 comprises a series of static images (such as a local weather report or a Quick Response (QR) code), and a third digital signage content 273 comprises a banner of different series of static images. For any digital signage player 200, at any point in time, the plurality of digital signage contents 270 displayed by its display 240 may include advertising in the form of still or video images, or other contents of interest. The arrangement of the plurality of digital signage contents 270 represented in FIG. 4 may vary. For instance, different numbers of digital signage contents 270 are displayed in different orientations. Moreover, the number of digital signage contents 270 and their respective orientations varies temporally.

Referring now concurrently to FIGS. 1, 2, 6A, 6B, 6C, 6D and 7, a management platform adapted for performing dynamic digital signage campaign optimization is represented.

Figure 6A:
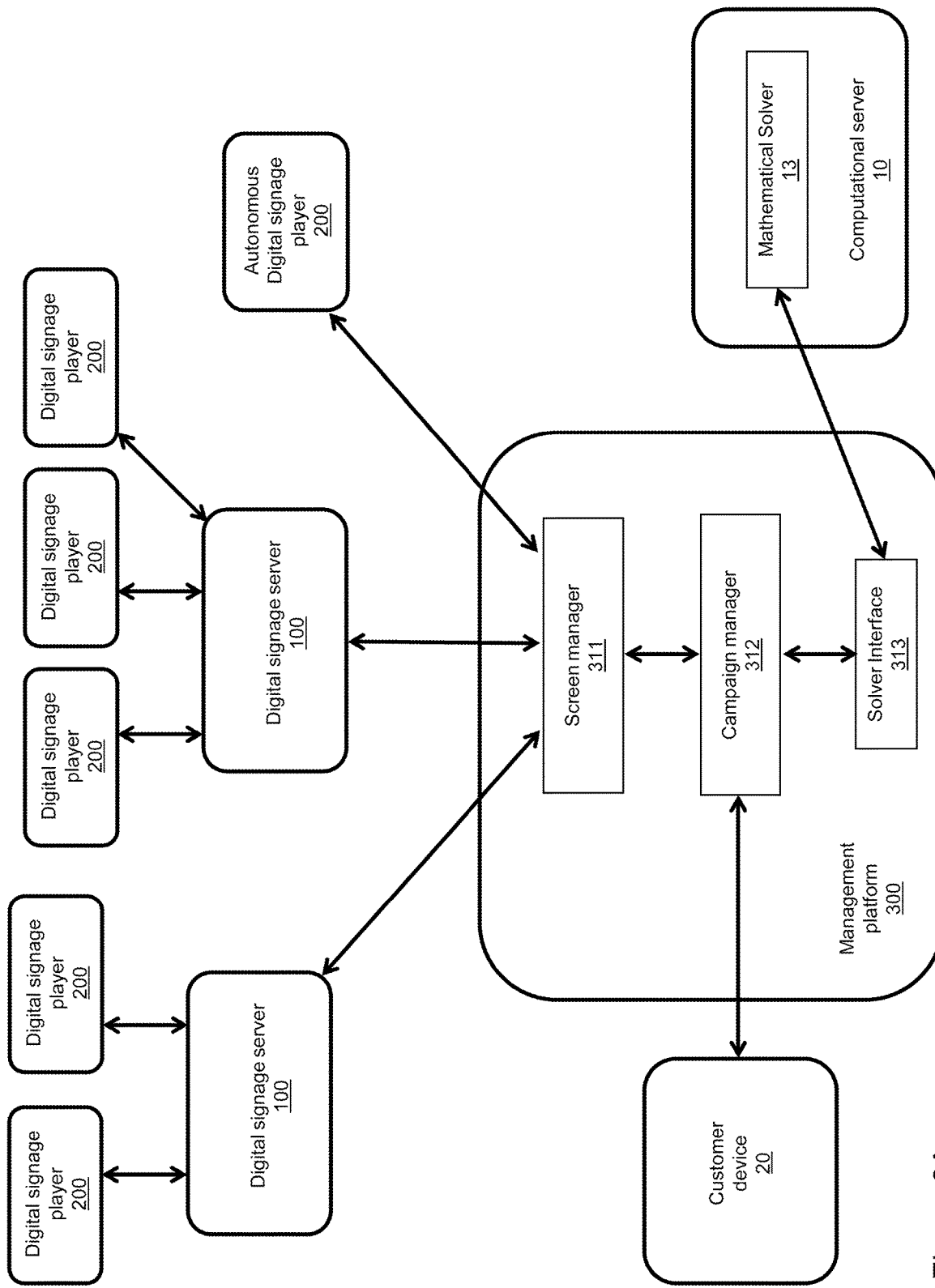
FIGS. 6A, 6B, 6C and 6D represent several implementations of a management platform using a mathematical solver for managing digital signage campaigns.
Figure 6B:
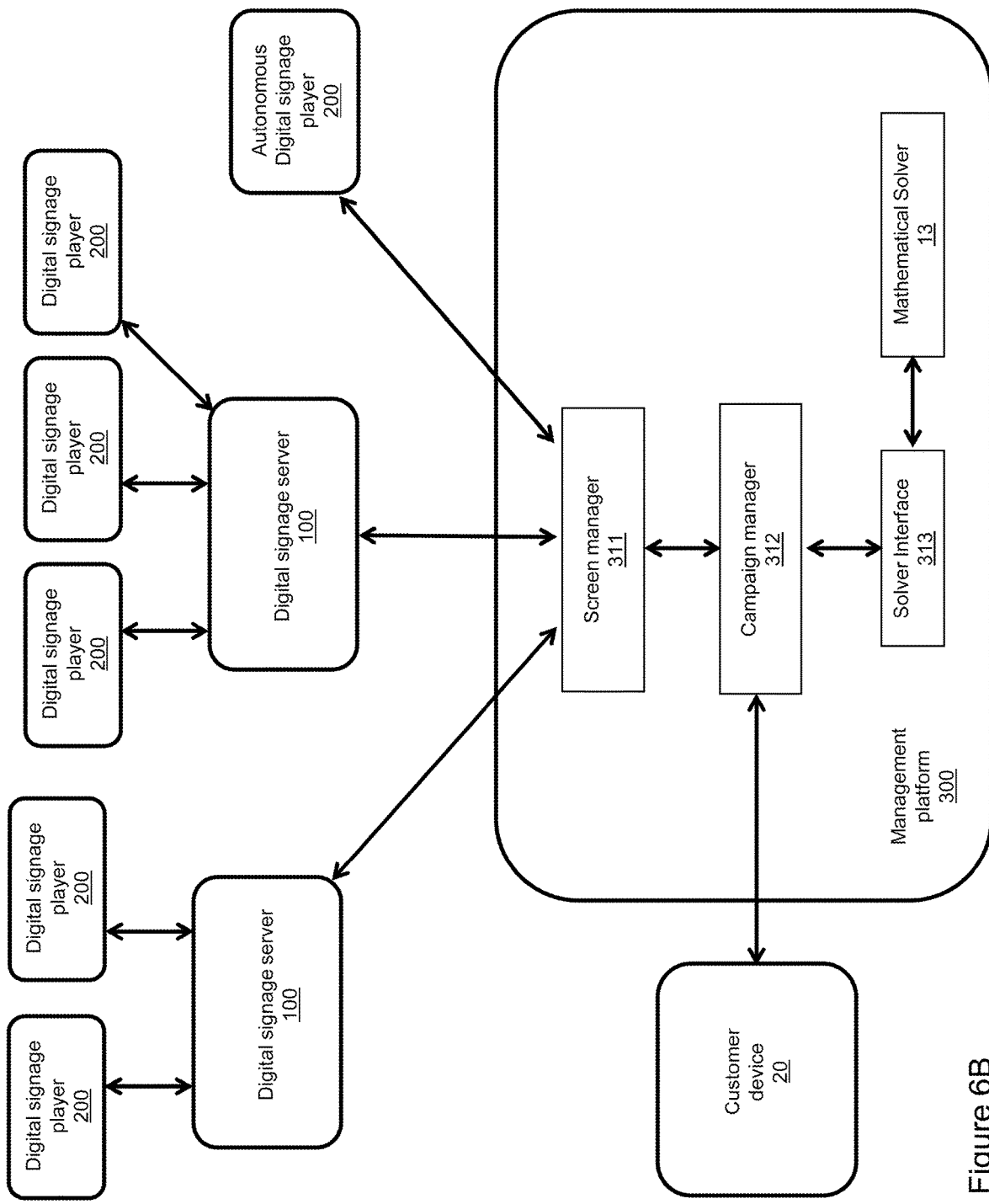

FIGS. 6A and 6B represent a management platform 300 capable of interacting with one or more digital signage server 100 and directly interacting with one or more autonomous digital signage player 200. Each digital signage server 100 of FIGS. 6A and 6B controls the display of digital signage content on one or more digital signage player 200 under its control. Each autonomous digital signage player 200 of FIGS. 6A and 6B (interacting directly with the management platform 300) autonomously controls the display of digital signage content on one or more display (not shown) under its control.

In an exemplary configuration (illustrated in FIGS. 6A and 6B), the management platform 300 interacts with a combination of any number of digital signage servers 100 and any number of autonomous digital signage players 200.

In another exemplary configuration (not illustrated in the Figures for simplification purposes), the management platform 300 only interacts with a plurality of digital signage servers 100.

In still another exemplary configuration (not illustrated in the Figures for simplification purposes), the management platform 300 only interacts with a plurality of autonomous digital signage players 200.

Figure 6C:
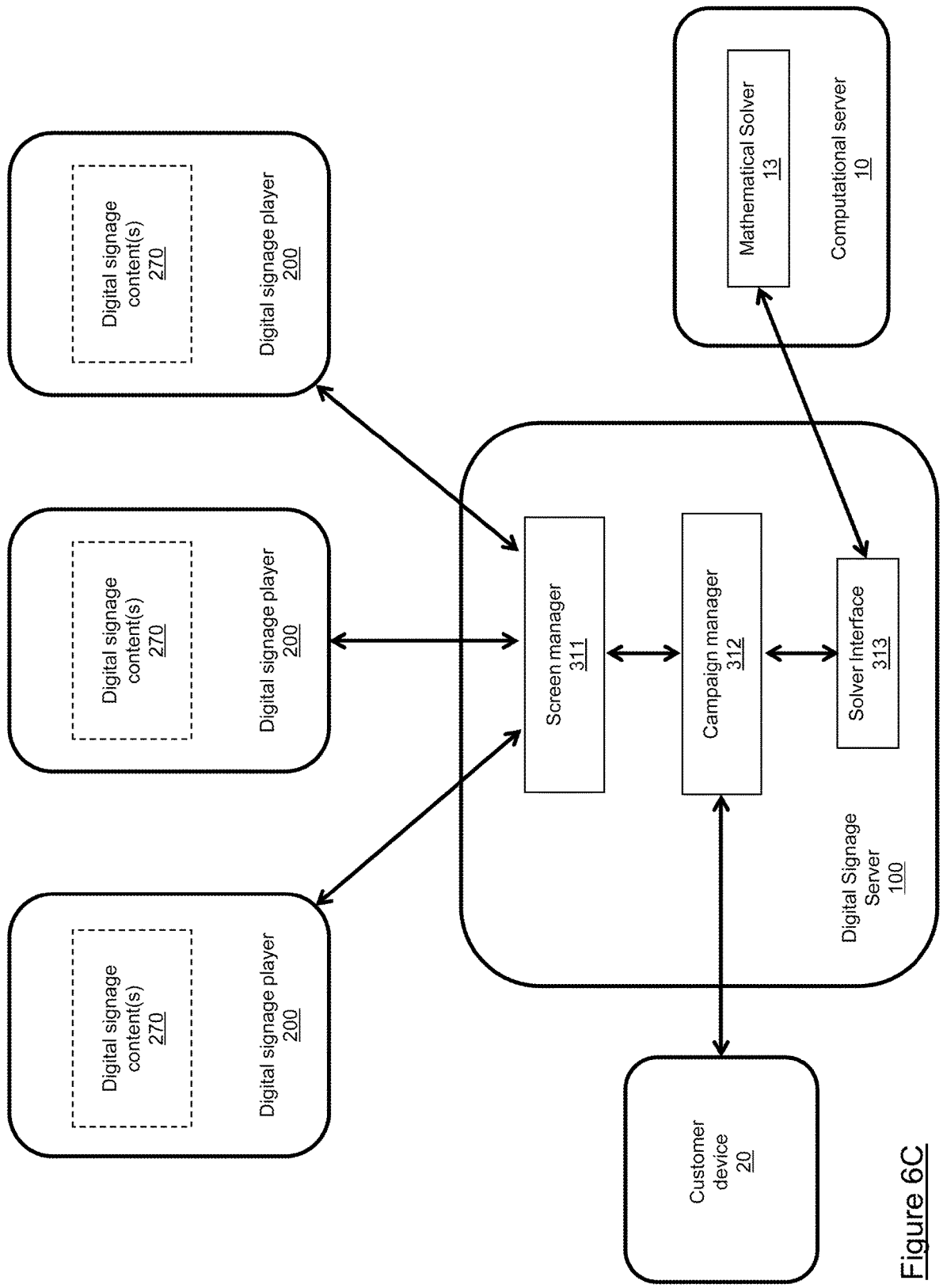
Figure 6D:
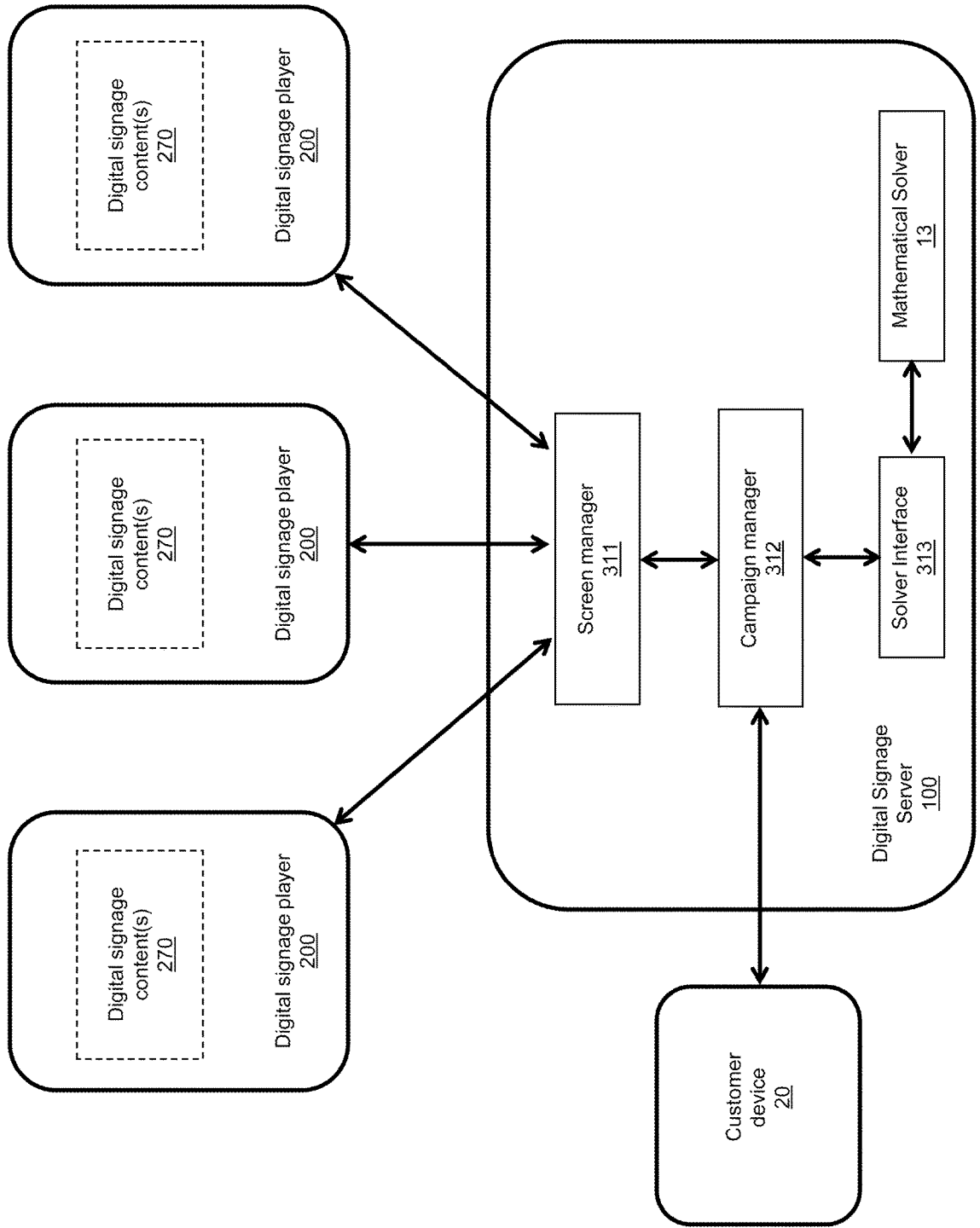

In yet another exemplary configuration illustrated in FIGS. 6C and 6D, the management platform 300 is implemented by a digital signage server 100 and only interacts with a plurality of digital signage players 200 under the control of the digital signage server 100. In this case, the digital signage server 100 combines the functionalities of a digital signage server and the functionalities of the management platform 300.

In still another exemplary configuration (not illustrated in the Figures for simplification purposes), the management platform 300 illustrated in FIGS. 6A and 6B is adapted to be implemented by a master digital signage server 100. The master digital signage server 100 interacts (when performing the functionalities of the management platform 300) with a combination of any number of peer digital signage servers 100 and any number of digital signage players 200 under the control of the master digital signage server 100.

Figure 7:
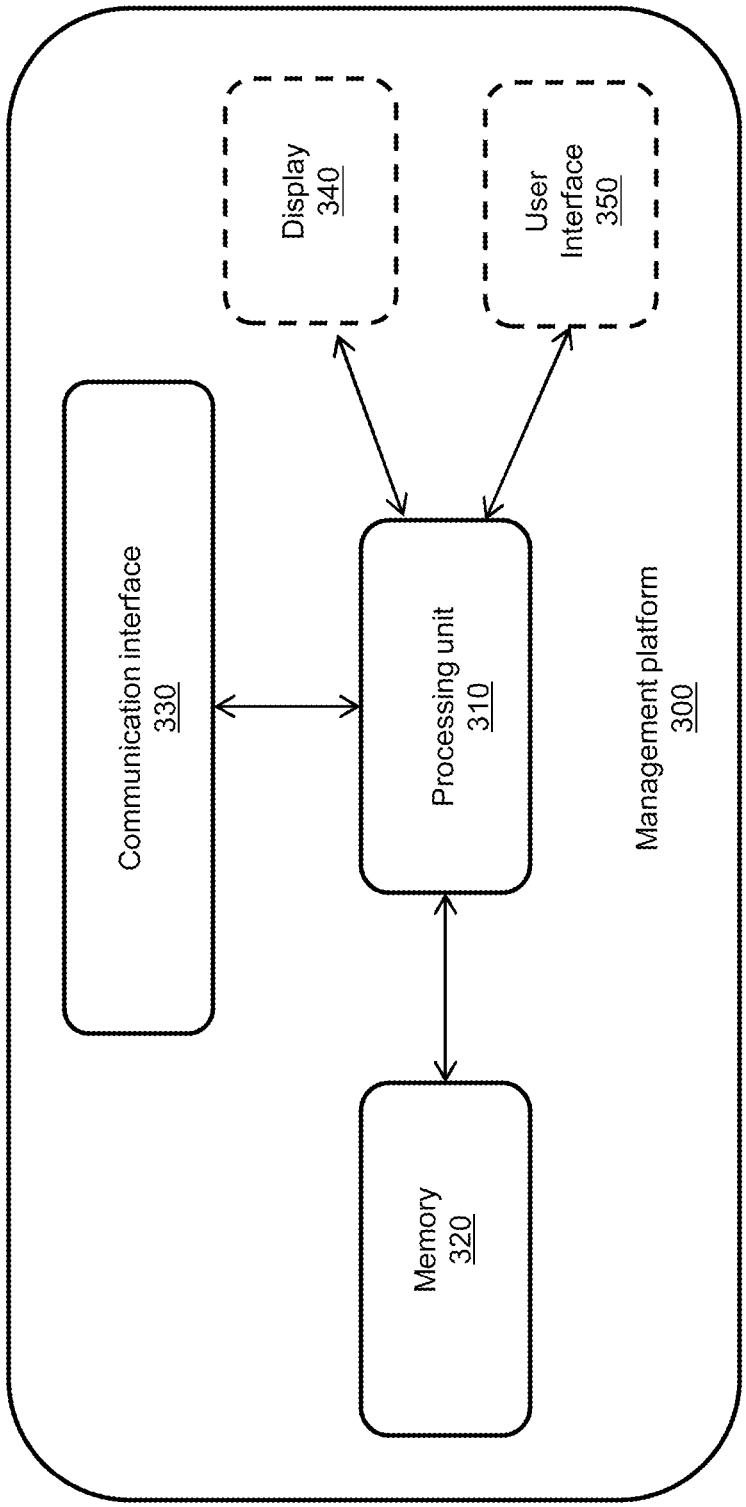
FIG. 7 represents details of the management platform illustrated in FIGS. 6A and 6B.

Referring more particularly to FIG. 7, details of the management platform 300 (represented in FIGS. 6A and 6B) are illustrated.

The management platform 300 comprises a processing unit 310. The processing unit 310 comprises one or more processor (not represented in FIG. 7 for simplification purposes) capable of executing instructions of computer program(s) for implementing functionalities of the management platform 300 (e.g. receiving data, processing the received data, generating data, transmitting the generated data, etc.). Each processor may further have one or more core.

The management platform 300 comprises memory 320. The memory 320 stores instructions of the computer program(s) executed by the processing unit 310, data generated by the execution of the computer program(s), data received via a communication interface 330, etc. The management platform 300 may comprise several types of memories, including volatile memory (e.g. volatile Random Access Memory (RAM), etc.) and non-volatile memory (e.g. a hard drive, electrically-erasable programmable read-only memory (EEPROM), flash, etc.).

The management platform 300 comprises the communication interface 330. The communication interface 330 allows the management platform 300 to exchange data with other computing devices (e.g. the digital signage servers 100, the autonomous digital signage players 200, customer device(s) 20, computational server(s) 10, etc.). The communication interface 330 supports one of the following communication technologies: fixed broadband, Ethernet, cellular (e.g. a 4G or 5G cellular network), Wi-Fi, wireless mesh, Bluetooth®, Bluetooth® Low Energy (BLE), etc. Although a single communication interface 330 is represented in FIG. 7, the management platform 300 may include several communication interfaces 330, each communication interface 330 supporting a given communication technology for exchanging data with computing devices also supporting the given communication technology.

Optionally, the management platform 300 also comprises a display 340 (e.g. a standard screen, a touchscreen, etc.) and/or a user interface 350 (e.g. a keyboard, a mouse, a touchscreen, a touchpad, etc.).

When the management platform 300 is implemented by a digital signage server 100 as shown on FIGS. 6C and 6D, the components of the management platform 300 represented in FIG. 7 correspond to the components of the digital signage server 100 represented in FIG. 1. In the following, functionalities of the management platform 300 will be described in relation to FIGS. 6A, 6B and 7. However, a person skilled in the art would readily adapt this description of the functionalities of the management platform 300 to the configurations illustrated in FIGS. 6C and 6D.

The functionalities of the management platform 300 are provided by several functional entities, including a screen manager 311, a campaign manager 312 and a solver interface 313. Each functional entity (e.g. screen manager 311, campaign manager 312, solver interface 313, etc.) is implemented by one or more software program comprising software instructions executed by the processing unit 310. Each software program is stored in the memory 320.

A person skilled in the art will readily understand that the implementation of the functionalities of the management platform 300 may be split between different functional entities than those represented in FIGS. 6A-6D, which are for illustration purposes only.

The campaign manager 312 manages digital signage campaigns under the responsibility of the management platform 300. In the rest of the description, a digital signage campaign will be referred to as a campaign for simplification purposes.

Furthermore, in the rest of the description, we will refer to the screens under the control of the management platform 300. A screen usually refers to a display 240 of a given digital signage player 200. The given digital signage player 200 is either directly under the control of the management platform 300 (e.g. the autonomous digital signage player 200 represented in FIGS. 6A and 6B) or is indirectly under the control of the management platform 300 via one of the digital signage servers 100 (the other digital signage players 200 illustrated in FIGS. 6A and 6B). If a digital signage player 200 has N displays 240 then it supports a corresponding number of N screens. If a digital signage server 100 has M digital signage players 200 under its control, each digital signage player 200 having N displays 240, then it supports a corresponding number of M*N screens. Therefore, each digital signage player 200 may control any number of screens, and the total number of screens supported by the management platform 300 corresponds to the total number of screens of the digital signage players 200 controlled by the management platform 300.

In a particular configuration, a single display 240 is divided into several independent areas (e.g. 271, 272 and 273 as illustrated in FIG. 4) and each independent area is considered as one independent screen. For example, the display 240 represented in FIG. 4 defines 3 screens. In another particular configuration, several displays 240 are considered as a single screen and usually display the same content simultaneously or multiple screens are merged for a period of time to display the content over a larger area of the display 240. For example, the digital signage player 200 represented in FIG. 3 may define a single screen corresponding to its two displays display 1 and display 2.

The screens under the control of the management platform 300 consist of all the screens respectively supported by the digital signage server(s) 100 and the autonomous digital signage player(s) 200 under the control of the management platform 300. For simplification purposes, in the rest of the description, an autonomous digital signage player 200 directly under the control of the management platform 300 (and not through an intermediate digital signage server 100) will be referred to as a digital signage player 200 under the control of the management platform 300.

The screen manager 311 manages the screens under the control of the management platform 300. The screen manager 311 implements several functionalities through interactions with the digital signage servers 100 and/or digital signage players 200 under the control of the management platform 300 via the communication interface 330.

One functionality of the screen manager 311 is to configure the digital signage servers 100 and/or digital signage players 200 under the control of the management platform 300, to deploy a new campaign which has been booked by the campaign manager 312.

Another functionality of the screen manager 311 is to collect information related to the execution of the currently active campaigns from the digital signage servers 100 and/or digital signage players 200 under the control of the management platform 300, and to report the information to the campaign manager 312.

An active campaign is a campaign that is currently being displayed on at least some of the screens under the control of the management platform 300. Initially, a campaign is a candidate campaign with requirements. The management platform 300 determines if the requirements of the candidate campaign can be satisfied, taking into consideration the already active campaigns. If the requirements can be satisfied, the candidate campaign becomes an active campaign.

Still another functionality of the screen manager 311 is to instruct the digital signage servers 100 and/or digital signage players 200 under the control of the management platform 300, to reconfigure the active campaign(s). The change(s) to the active campaign(s) are determined by the campaign manager 312.

Yet another functionality of the screen manager 311 is to generate and update information related to the screens under the control of the management platform 300. In the rest of the description, the information related to the screens under the control of the management platform 300 will be referred to as screen data. The screen data are organized into one or more data structure, which are stored in the memory 320. Various types of data structures can be used for organizing the screen data (e.g. one or more table, a database, etc.).

The screen data comprise at least two types of information: screen characteristic data defining characteristics of each screen under the control of the management platform 300 and screen activity data defining the activity level(s) (in terms of active campaigns) of each screen under the control of the management platform 300. The screen data are used by the campaign manager 312 to determine if a new candidate campaign can be deployed.

The screen data are generated based on information collected from the digital signage servers 100 and/or digital signage players 200 under the control of the management platform 300. However, some of the screen data (in particular, some of the screen characteristic data) may be static information (e.g. location of the screens, size of the screens, etc.) stored in a configuration file in the memory 320 of the management platform 300.

Examples of screen characteristic data comprise screen schedule data (e.g. operating hours and operating days of the screen), duration of a loop of digital content displayed by the screen, a number of impressions per unit of time for the screen (e.g. number of impressions per hours, which may vary within the screen schedule), a cost (e.g. a cost per 1000 impressions generally referred to as cpm, which may vary as a function of time), a location of the screen, a geometry of the screen (e.g. size of the screen), etc.

Examples of screen activity data comprise time periods of content display at the screen for each active campaign, duration of the content displayed for each active campaign, number of repetitions in the loop of the screen (also referred to as PPL for Play(s) Per Loop or Frequency) for each active campaign, percentage of occupation of the loop of the screen for each active campaign, percentage of occupation of the loop of the screen by all the active campaigns, etc.

Following is an example of screen activity data for three active campaigns A, B and C at a screen having a loop of 100 seconds. The three campaigns are all played between 9 am and 6 pm. Campaign A has a content having a duration of 10 seconds, is repeated two times in the loop, occupies 20% of the loop. Campaign B has a content having a duration of 20 seconds, is repeated one time in the loop, occupies 20% of the loop. Campaign C has a content having a duration of 15 seconds, is repeated two times in the loop, occupies 30% of the loop. The total occupation of the loop (by campaigns A, B and C) is 70%.

In the rest of the description, all the screens under the control of the management platform 300 will be referred to as the controlled screens for simplification purposes.

The campaign manager 312 interacts with customer device(s) via the communication interface 330. A customer device 20 transmits requirements of a candidate campaign to the campaign manager 312. The requirements of a campaign usually comprise one or more goal for the campaign, and one or more constraint for the campaign. These requirements will be detailed later in the description. The campaign manager 312 processes the requirements of the candidate campaign, to determine if the candidate campaign can be deployed on the controlled screens. The determination takes into consideration at least some of the screen data generated by the screen manager 311.

The result of the determination (if the candidate campaign can be deployed on the controlled screens) is an availability status (also referred to as availability metric). The campaign manager 312 generates a full availability status if the candidate campaign can be deployed on the controlled screens in accordance with the requirements of the candidate campaign. The campaign manager 312 generates an unavailable status if the candidate campaign cannot be deployed on the controlled screens in accordance with the requirements of the candidate campaign. A status of partial availability may also be generated for certain types of campaign goals (e.g. target number of plays, target number of impressions, etc.), indicating that the candidate campaign can be deployed on the controlled screens, but the goal of the candidate campaign will be only partially achieved. For example, one of the requirements of the candidate campaign is a target number of plays of a content over a period of time. A partially available status provides a percentage of the number of plays which can be reached (e.g. 90% of 10 000 plays over a one-month period).

The campaign manager 312 transmits a feedback to the customer device 20 for the candidate campaign, comprising the availability status. In the case where the status is unavailable or partially available, the customer device 20 may modify the requirements of the candidate campaign and transmit the modified requirements to the campaign manager 312, to determine if the modified candidate campaign can be deployed on the controlled screens with the modified requirements.

In the case where the status is available (and optionally conditional to a confirmation by the customer device 20), the candidate campaign is deployed by the campaign manager 312. The deployment comprises the determination by the campaign manager 312 of the controlled screens where the content of the new campaign will be displayed and the determination of the corresponding configuration for each selected screen. The display configuration of the selected screens is enforced by the screen manager 311, by sending configuration commands to the digital signage servers 100 and/or digital signage players 200 corresponding to the selected screens. The campaign manager 312 also updates the screen activity data, to take into consideration the impact of the newly deployed campaign on the availability of the controlled screens.

As mentioned previously, the screen manager 311 collects information related to the execution of the newly deployed campaign from the digital signage servers 100 and/or digital signage players 200 under the control of the management platform 300. The screen manager 311 reports the information to the campaign manager 312. As will be described later, the campaign manager 312 may take corrective actions if one or several of the active campaigns are not performing as expected. Furthermore, the campaign manager 312 generally provides feedbacks on the execution of the active campaigns to the customer devices 20 from which the campaign was booked.

The campaign manager 312 usually executes an availability engine for performing the functionality of processing the requirements of the candidate campaign, to determine if the candidate campaign can be deployed on the controlled screens, based on at least some of the screen data generated by the screen manager 311.

Figure 5:
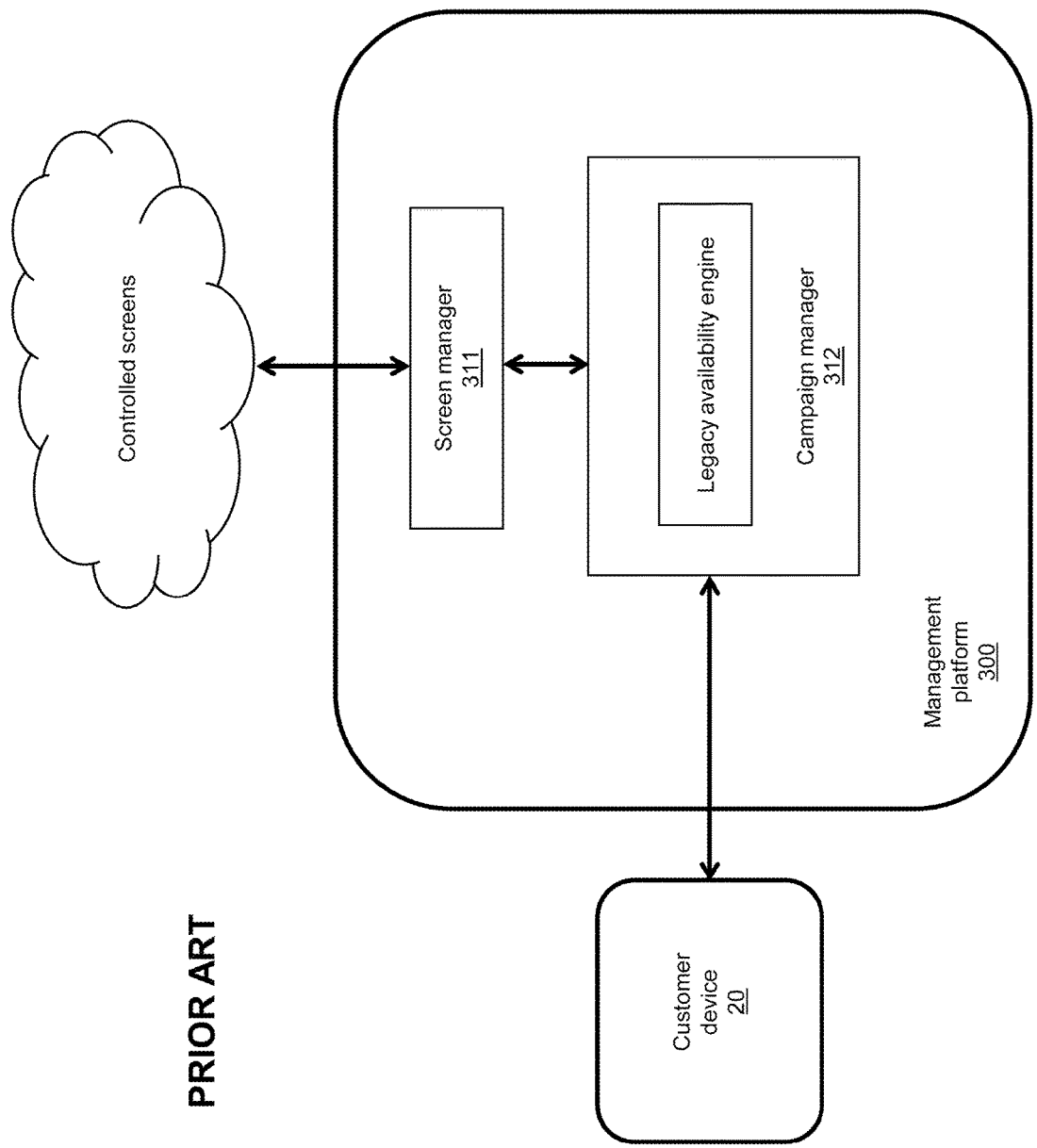
FIG. 5 represents a management platform executing a legacy availability engine for managing digital signage campaigns.

The availability engine is generally a legacy proprietary software, which has been developed to support a certain number of use cases. Therefore, the support of additional use cases requires the adaptation of the proprietary software, which may prove difficult, time consuming, costly, etc. Furthermore, the proprietary software may have been optimized for the support of the original use cases, and the performances of the proprietary software may be degraded when adding support for new use cases. FIG. 5 schematically represents a campaign manager 300 executing a legacy availability engine to determine the availability at screens under its control for displaying the content of a candidate campaign.

The present disclosure aims at replacing legacy availability engines (which are currently used in the digital signage industry) by a mathematical solver 13.

The mathematical solver 13 may not be dedicated to the digital signage industry (although it might be the case). The mathematical solver is capable of solving complex optimization problems involving a large number of variables and a complex set of constraints.

A type of mathematical solver 13 adapted to the digital signage industry is a nonlinear optimization solver, which is adapted to solving an optimization problem where some of the constraints or the objective function are nonlinear. However, other types of mathematical solver 13 may also be used in the context of the present disclosure.

A solver interface functionality 313 is used as an interface layer between the campaign manager 312 and the mathematical solver 13. As mentioned previously, the solver interface 313 is executed by the processing unit 310 of the management platform 300.

The solver interface functionality 313 translates at least some of the data related to a candidate campaign into mathematical equation(s). The mathematical solver 13 attempts to solve the mathematical equation(s) and provides either a mathematical solution or an indication that no solution to the mathematical equation(s) has been found. Optionally, a partial solution is provided. The solver interface functionality 313 translates the mathematical solution into configuration data used by the campaign manager 312 for implementing the candidate campaign by configuring the controlled screens in accordance with the configuration data. More details will be provided later in the description, in relation to FIG. 8.

FIGS. 6A and 6C illustrate an architecture where the mathematical solver 13 is executed by an independent computational server 10. The interactions between the solver interface 313 and the mathematical solver 13 are performed via the communication interface 330 of the management platform 300. In this exemplary architecture, the mathematical solver 13 can be provided by a third party through a cloud infrastructure, which supports for example load balancing between a plurality of computational servers 10. The computational servers 10 are dedicated servers with a large capacity in terms of processing power.

FIGS. 6B and 6D illustrate an alternative architecture where the mathematical solver 13 is directly executed by the management platform 300 (which consists of a digital signage server 100 in the case of FIG. 6D). For example, this architecture is adapted to a management platform 300 with a limited number of screens under its control, in which case the processing power required by the mathematical solver 13 is limited and can be provided by the processing unit 310 of the management platform 300.

Following are examples of requirements of a candidate campaign. The terminology today, tomorrow, the next day, etc. will be used for exemplary purposes. However, these days may be in the future, today being the first day of a period of time under consideration for booking the candidate campaign. An availability metric is defined and calculated for certain types of requirements (in general for the requirements consisting of campaign goals). An example of availability metric is the percentage of time for which the candidate campaign can be deployed over a given period of time and among all the screens under the control of the management platform 300.

A first exemplary campaign requirement is a Play Per Loop (PPL) goal (also referred to as Frequency goal). The PPL defines a fixed number of times the content of the candidate campaign is played in a loop. For example, the PPL is set to 2 and the content duration is 15 seconds. If a screen has a loop length of 90 seconds for today and the loop is already booked for 50 seconds, then the candidate campaign fits today because 50+2*15 is equal to 80, which is lower than the loop length (90). If the screen has a loop length of 90 second for tomorrow and the loop is already booked for 80 seconds, then the candidate campaign does not fit tomorrow because 80+2*15 is equal to 110, which is greater than the loop length (90). If the screen has a loop length of 90 second for the next day and the loop is already booked for 65 seconds, then the candidate campaign does not fit the next day because 65+2*15 is equal to 95, which is greater than the loop length (90). In this example, the candidate campaign could be deployed today, but not tomorrow and not the next day. The availability of the screen under consideration for the candidate campaign would be 33.33% over the period consisting of the three consecutive days.

A second exemplary campaign requirement is a fixed Share Of Voice (SOV) goal. The fixed SOV defines a fixed percentage of a loop to be used for the candidate campaign. For example, the fixed SOV is set to 50%. If a screen has a loop length of 90 seconds for today and the loop is already booked for 50 seconds, then the candidate campaign does not fit today because 50+50% of 90 is equal to 95, which is greater than the loop length (90). If the screen has a loop length of 120 seconds for tomorrow and the loop is already booked for 50 seconds, then the candidate campaign fits tomorrow because 50+50% of 120 is equal to 110, which is lower than the loop length (120). If the screen has a loop length of 120 seconds for the next day and the loop is already booked for 80 seconds, then the candidate campaign does not fit the next day because 80+50% of 120 is equal to 140, which is higher than the loop length (120). In this example, the candidate campaign can be deployed tomorrow to the screen of interest, but not today and not the next day. The availability of the screen under consideration for the candidate campaign is 33.33% over the period consisting of the three consecutive days.

A third exemplary campaign requirement is a Takeover SOV goal. The Takeover SOV also defines a fixed percentage of a loop to be used for the candidate campaign. However, in the case of the Takeover SOV, the fixed percentage of the loop needs to be fulfilled at all times for a given screen. For example, considering the previous example, the fixed percentage is not fulfilled for today and the next day. Thus, the candidate campaign cannot be deployed on the screen under consideration. The availability of the screen under consideration for the candidate campaign is 0% over the period consisting of the three consecutive days.

A fourth exemplary campaign requirement is an Average SOV goal. Average SOV goals comprise an average SOV goal for the candidate campaign, an average SOV goal per day, an average SOV goal per day and per screen, etc. In the case of the average SOV goal for a campaign and the average SOV goal per day, a corresponding SOV goal is calculated for each screen under consideration. For example, having the average SOV goal per day and the total number of screens under consideration, the SOV goal for each screen under consideration is the average SOV goal per day divided by the total number of screens. The calculation of the availability of a screen under consideration for the candidate campaign is similar to the aforementioned calculation in case of SOV.

A fifth exemplary campaign requirement comprises one of a number of impressions goal, a number of plays goal or a budget goal. Any screen capable of contributing to the achievement of the goal is considered. For example, a given screen has a defined number of impressions per hour (e.g.

1000 impressions per hour) for a given period of time (e.g. today). An available slot (e.g. 15 seconds) in a loop of the given screen has a contribution (1000*15/3600) in terms of impressions towards the goal of the candidate campaign set at a total number of impressions (e.g. 50 000 impressions in total). Similarly, an available slot in a loop (e.g. a loop of 60 seconds repeated 600 times during the day) of the given screen has a contribution (600 plays during the day) in terms of plays towards the goal of the candidate campaign set to a total number of plays (e.g. 10 000 plays in total). The given screen also has a defined cost per 1000 (cpm) impressions, for example 10 $. The aforementioned available slot (e.g. 15 seconds) in a loop of the given screen has a contribution (1000*15/3600*10/1000) in terms of cost towards the goal of the candidate campaign set to a total budget (e.g. 100 000 $ in total). An availability score for the candidate campaign is also calculated, based on the contribution of the screens under consideration to the goal of the campaign in terms of number of impressions, number of plays or budget.

A sixth exemplary campaign requirement is a campaign constraint. A first example of campaign constraint consists of a constraint on the location of the screens where the candidate campaign shall be deployed. For example, the constraint defines one or more target cities, one or more target neighborhoods of a given city, one or more regions of a country, one or more target types of venues (e.g. restaurant, airport, movie theater, etc.), a combination thereof, etc. A second example of campaign constraint consists of a constraint on the number of screens where the candidate campaign shall be deployed (e.g. the candidate campaign shall be spread over 100 screens). A third example of campaign constraint consists of a constraint on the days of the candidate campaign (e.g. a time period consisting of the first three weeks of July 2022). A constraint on the scheduling hours for each day of the candidate campaign is generally also used (resulting in time periods combining days and hours).

More complex campaign constraints may be defined, such as requiring a homogenous spreading of the candidate campaign over the duration of the campaign and/or over the screens where the campaign is displayed. The usage of more complex constraints is dependent on the capability of the mathematical solver 13 to support such complex campaign constraints. Complex campaign constraints are more demanding in terms of processing power and time for finding a solution. For example, if no homogenous spreading of the candidate campaign is required, the first solution identified by the mathematical solver 13 respecting the other goal(s) and constraint(s) of the candidate campaign is selected. However, if homogenous spreading of the candidate campaign is required, all the solution(s) respecting the other goal(s) and constraint(s) of the candidate campaign need to be identified by the mathematical solver 13. Then, the best solution (for implementing homogenous spreading of the candidate campaign) among the identified solution(s) is selected.

A person skilled in the art would readily understand that other types of campaign goals and campaign constraints may be defined as requirements for a candidate digital campaign based on the above information.

Following is how a candidate campaign is processed by a legacy availability engine (executed by the campaign manager 312). Requirements (usually comprising one or more campaign goal and one or more campaign constraint) are defined for the candidate campaign (through interactions of the management platform 300 with the customer device 20). The requirements of the candidate campaign are processed by the availability engine and an availability metric is returned (e.g. a percentage of availability).

If the availability metric is 100%, then the candidate campaign is deployed (i.e. booked and implemented). If the availability metric is below 100%, then some of the following actions are taken. A user of the management platform 300 manually adapts active campaigns to make room for the candidate campaign (e.g. cancel one or more active campaigns, modify the configuration data of one or more active campaign, etc.). Alternatively, the user of the management platform 300 interacts with the customer to change some of the requirements of the candidate campaign, to improve the chances of having an availability metric at 100. In the latter case, a new candidate campaign with new requirements is received from the customer device 20 and processed by the legacy availability engine.

Consequently, legacy availability engines have several drawbacks. One of the drawbacks is the aforementioned lack of automation to address a candidate campaign which cannot be deployed when taking into consideration the active campaigns. Another drawback is the lack of flexibility of legacy availability engines implemented with a proprietary software, to support new use cases (e.g. new types of campaign goals and/or campaign constraints used as requirements of the campaigns).

Figure 8:
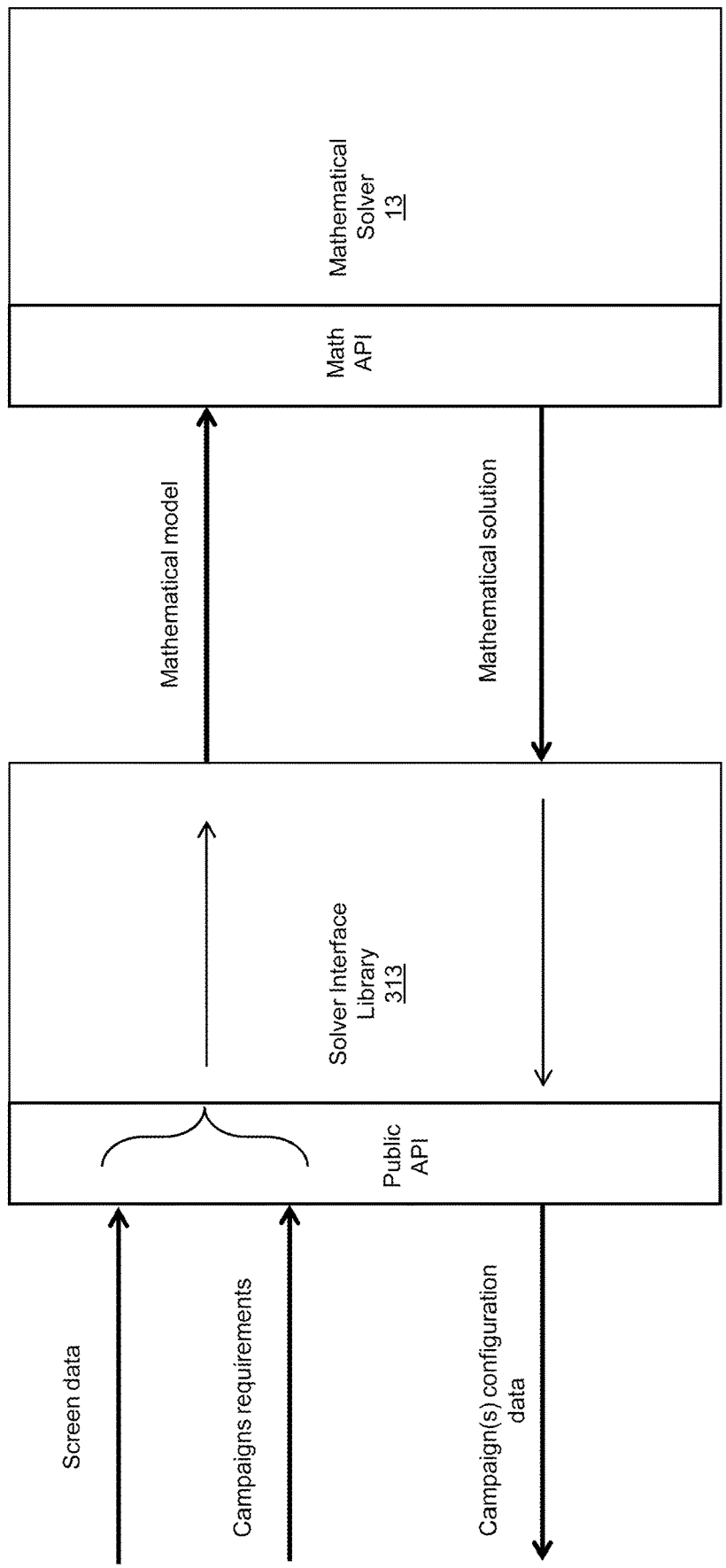
FIG. 8 represents interactions between the mathematical solver and a solver interface illustrated in FIGS. 6A, 6B, 6C and 6D.

Reference is now made concurrently to FIGS. 6A, 6B, 6C, 6D and 8, where FIG. 8 illustrates the operations of the solver interface 313 and mathematical solver 13 represented in FIGS. 6A-D.

The solver interface 313 receives the requirements of a candidate campaign, the requirements of active campaign(s), and at least some of the screen data. The solver interface 313 generates a mathematical model based on the requirements of the candidate campaign, the requirements of the active campaign(s) and the screen data used as inputs. The mathematical model is transmitted to the mathematical solver 13. The solver 13 processes the mathematical model to generate a mathematical solution. The mathematical solution is processed by the solver interface 313 to generate candidate campaign configuration data, which are used by the campaign manager 312 for deploying the candidate campaign over the screens under the control of the management platform 300. As mentioned previously, one type of mathematical solver 13 particularly adapted to the optimization of configuration data is a nonlinear optimization solver. However, other types of mathematical solvers may be used as well, based on their intrinsic optimization capabilities.

The requirements of the candidate campaign and the requirements of the active campaign(s) may include various combinations of campaign goal(s) and campaign constraint(s). The screen data used as inputs of the solver interface 313 comprise at least some of the screen characteristic data and at least some of the screen activity data.

The usage of the mathematical solver 13 and solver interface 313 provides the following additional capability; if a goal defined for the candidate campaign (e.g. target number of impressions or views) cannot be satisfied in view of the active campaigns, the mathematical solver 13 is capable of finding a mathematical solution for adapting the configuration of one or more active campaign, to accommodate the candidate campaign. However, the configuration of one of the active campaign is adapted only if the reconfiguration respects all the campaign goal(s) and constraint(s) associated to the active campaign(s) being reconfigured. One exception to this rule is when priorities are allocated to the campaigns, as will be detailed later in the description. In this case, a lower priority active campaign may relinquish some space to the candidate campaign or other active campaign(s) with a higher priority, even at the cost of not achieving a goal allocated to the lower priority active campaign. In the case where reconfiguration occurs, the processing of the mathematical solution by the solver interface 313 also generates modified configuration data for one or more active campaign. The modified configuration data are used by the campaign manager 312 for reconfiguring the one or more active campaign over the screens under the control of the management platform 300.

If N campaigns are active, the number of active campaigns which are reconfigured (for accommodating the candidate campaign) may vary from 0 to N.

Following is an example of how the availability metric is determined. The mathematical solution generated by the mathematical solver 13 needs to respect all the campaign constraints associated to the candidate campaign and all the campaign constraints associated to the active campaigns. If a mathematical solution respecting all the campaign constraints cannot be found, the output of the mathematical solver 13 comprises an indication that a solution cannot be found (e.g. an availability metric for the candidate campaign at 0%).

Additionally, the mathematical solution generated by the mathematical solver 13 needs to respect all the campaign goals associated to the active campaigns. If a mathematical solution respecting all the campaign goals of the active campaigns cannot be found, the output of the mathematical solver 13 comprises an indication that a solution cannot be found (e.g. an availability metric for the candidate campaign at 0%). As mentioned previously, one exception to this rule is when priorities are allocated to the campaigns, in which case it is acceptable not to respect the campaign goal(s) of a lower priority active campaign to accommodate a candidate campaign with a higher priority.

In the most favorable case, the mathematical solution further respects the campaign goal(s) of the candidate campaign (the availability metric for the candidate campaign is 100%). In this case, the candidate campaign can be deployed. Alternatively, the mathematical solution partially respects the campaign goal(s) of the candidate campaign (the availability metric for the candidate campaign is between 0% and 100%). In this case, a decision needs to be taken whether or not to deploy the candidate campaign with partially satisfied campaign goals. However, contrary to the previously mentioned legacy availability engines, the mathematical solution generated by the mathematical solver 13 is the best possible (at least in most cases) and therefore there is no need to manually try and find a better solution.

The solver interface 313 implements a library which acts as a contextual wrapper around the mathematical solver 13. The mathematical solver 13 provides a mathematical Application Programming Interface (API). The library implemented by the solver interface 313 provides a public API to the campaign manager 312. Requirements of the campaigns and screen data are received from the campaign manager 312 via the public API and converted into mathematical statements for the mathematical model, which are passed via the mathematical API to the mathematical solver 13. The mathematical solution is received from the mathematical solver 13 via the mathematical API and converted into campaign configuration data, which are passed via the public API to the campaign manager 312 for deployment.

Following are examples of mathematical statements of the mathematical model. For a campaign goal consisting of a target number of impressions, the mathematical statement is that the sum of the impressions on all the screens must be equal to the target number of impressions. For a campaign constraint consisting of a selection of screens for displaying the campaign, the mathematical statement is that the number of impressions is greater than 0 only on the selected screens. For a campaign constraint consisting of a selection of time periods for displaying the campaign, the mathematical statement is that the number of impressions is greater than 0 only for the selected time periods. These mathematical statements are generated for the candidate campaign as well as for the active campaigns. Similarly, screen data (screen characteristic data and screen activity data) are translated into mathematical statements.

Following in an exemplary representation of the requirements of the campaigns and screen data into a mathematical model. This exemplary representation is for illustration purposes only. A person skilled in the art would readily understand that other representations can be used.

One variable is defined per campaign and per screen interval. A screen interval consists of a screen and a time range (e.g. screen 1 between 9 am and 12 pm). For illustration purposes, we consider 2 campaigns and 3 screen intervals. Campaign 1 being active in screen intervals 1 and 2, two corresponding variables $x_{1,1}$ and $x_{1,2}$ are defined. Campaign 2 being active in screen intervals 2 and 3, two corresponding variables $x_{2,2}$ and $x_{2,3}$ are defined. Variables $x_{1,1}$, $x_{1,2}$, $x_{2,2}$ and $x_{2,3}$ represent a number of seconds of play in the loop.

For illustration purposes, we further consider a loop length of 100 seconds and a goal consisting of a target number of impressions of 1800 for campaign 1 and 3000 for campaign 2. A coefficient is used for converting between a number of seconds of play in a given loop (of a given screen) and a corresponding number of impressions (e.g. 1 second of play in the given loop corresponds to 10 impressions and taking the full 100 seconds of the loop corresponds to 1000 impressions). The coefficient is calculated based on the screen characteristic data relative to the number of impressions per unit of time for the given screen. For example, for interval 1 the coefficient is 10, for interval 2 the coefficient is 20 and for interval 3 the coefficient is 30.

The corresponding mathematical model is as follows:

$$10^*x_{1,1}+20^*x_{1,2}=1800$$

$$20^*x_{2,2}+30^*x_{2,3}=3000$$

$$x_{1,1}<=100, x_{1,2}+x_{2,2}<=100 \text{ and } x_{2,3}<=100$$

In order to ensure a smooth distribution of the solution, an additional constraint can be added to the mathematical model: the L2 norm of the solution vector is minimized (minimizing the sum of the squares of $x_{1,1}$, $x_{1,2}$, $x_{2,2}$ and $x_{2,3}$).

Figure 9A:
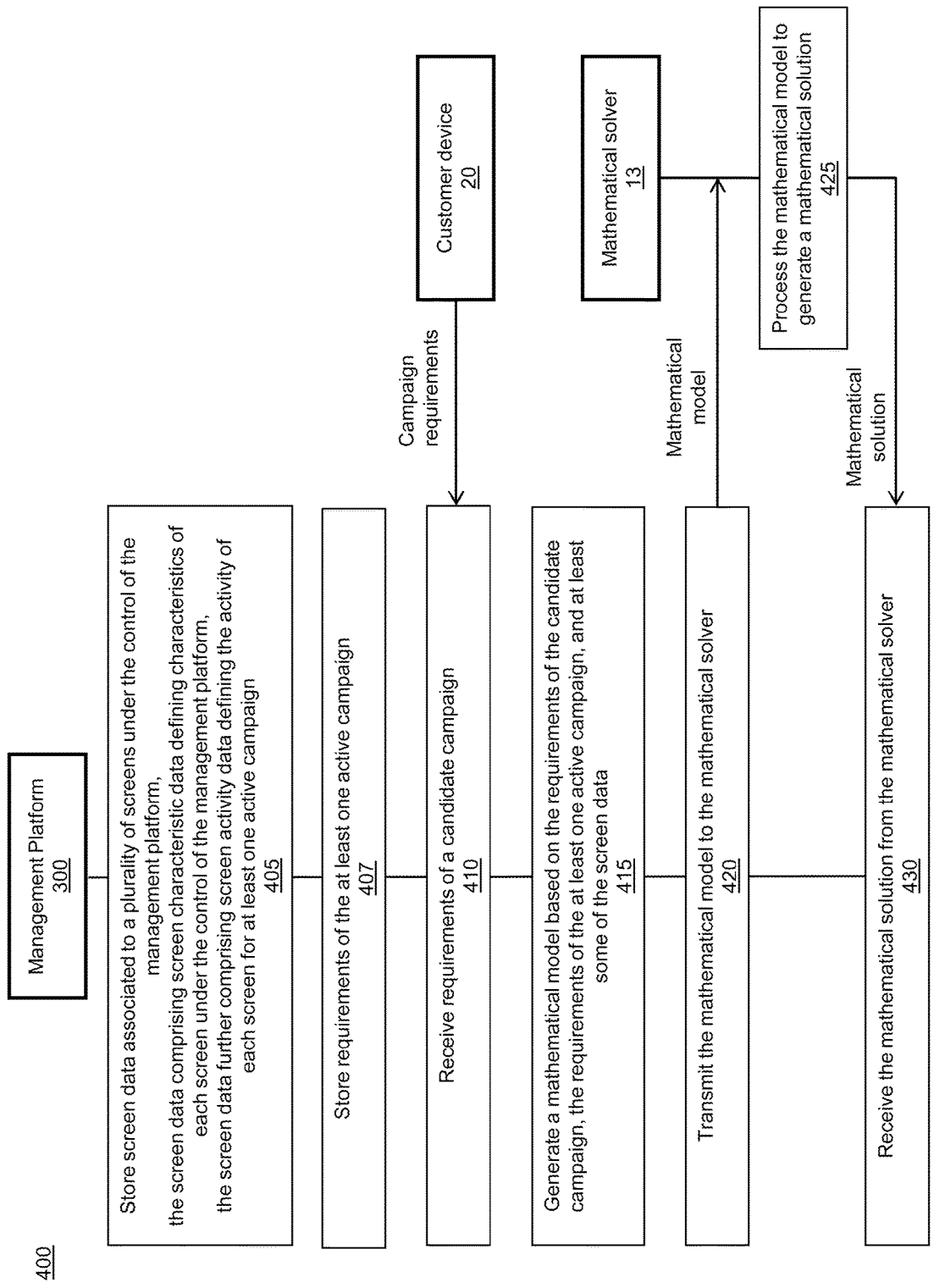
FIGS. 9A and 9B represent a method implemented by the management platform of FIGS. 6A and 6B for performing dynamic digital signage campaign optimization.
Figure 9B:
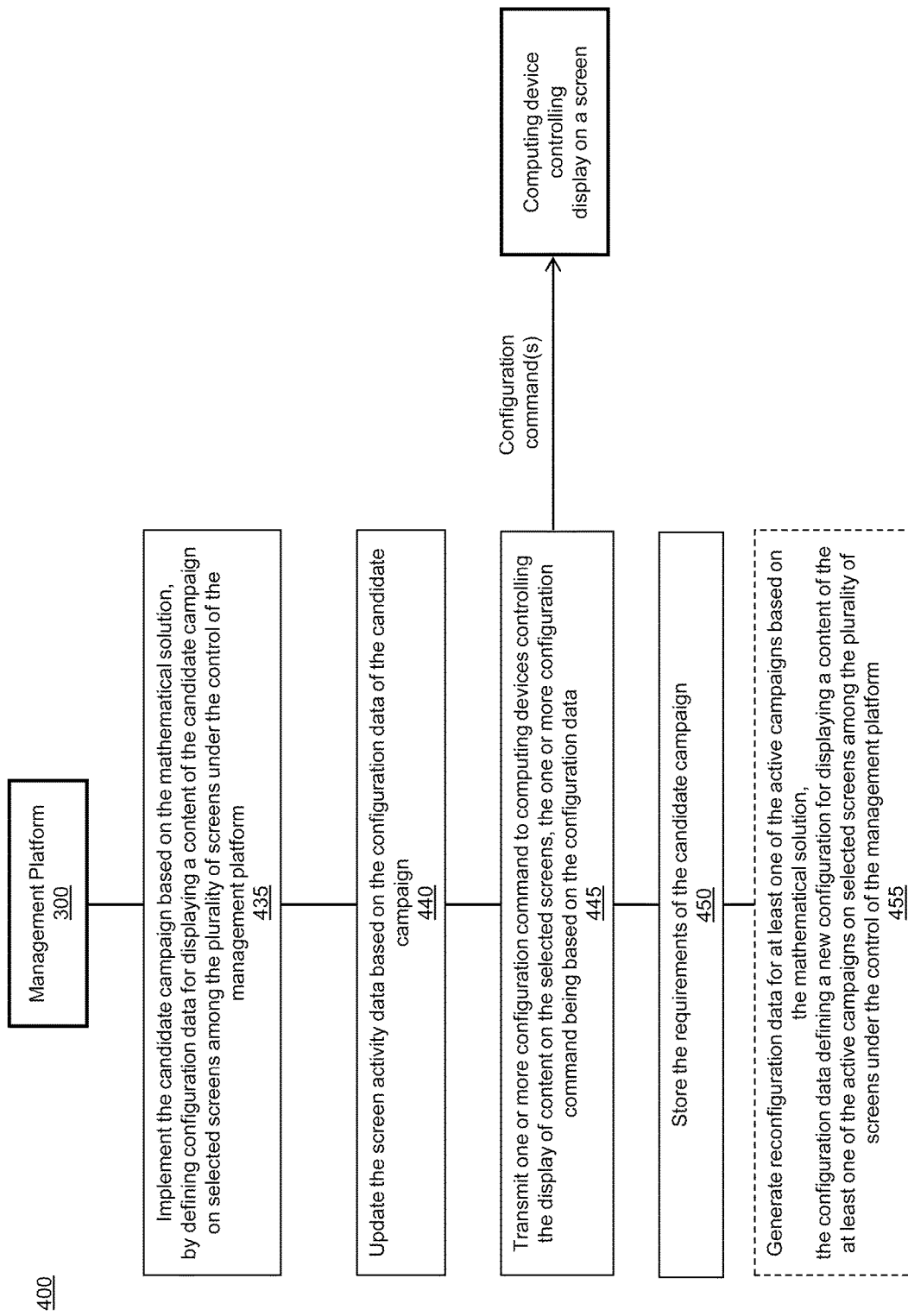

Referring now concurrently to FIGS. 6A, 6B, 7, 8, 9A and 9B, a method 400 for performing dynamic digital signage campaign optimization is represented in FIGS. 9A and 9B. The method 400 is performed by the management platform 300.

A dedicated computer program has instructions for implementing the steps of the method 400. The instructions are stored in a non-transitory computer-readable medium (e.g. the memory 320). The instructions provide for performing dynamic digital signage campaign optimization, when executed by the processing unit 310 of the management platform 300. The instructions are deliverable via an electronically-readable media, such as a storage media (e.g. a USB key), or via communication links (e.g. a Wi-Fi or cellular network) through the communication interface 330 of the management platform 300.

The method 400 comprises the step 405 of storing in the memory 320 screen data associated to a plurality of screens under the control of the management platform 300.

As mentioned previously, the screen data comprise screen characteristic data defining characteristics of each screen under the control of the management platform 300. The screen data further comprise screen activity data defining the activity of each screen for the active campaign(s). Examples of screen characteristic data and screen activity data have been provided previously.

The method 400 comprises the step 407 of storing in the memory 320 requirements of the at least one active campaign.

The method 400 comprises the step 410 of receiving requirements of a candidate campaign. Step 410 is executed by the campaign manager 312 (executed by the processing unit 110).

As mentioned previously, the requirements usually comprise at least one campaign goal and at least one campaign constraint for the candidate campaign (and for the active campaign(s) mentioned at step 407). Examples of campaign goals and campaign constraints have been described previously.

The requirements are generally received via the communication interface 330 from the customer device 20. Alternatively, at least some of the requirements are received (from a user of the management platform 300) via the user interface 350 of the management platform 300.

The method 400 comprises the step 415 of generating a mathematical model based on the requirements of the candidate campaign (received at step 410), the requirements of the at least one active campaign (stored at step 407), and at least some of the screen data (stored at step 405). Step 415 is executed by the solver interface 313 (executed by the processing unit 110). Step 415 has been described previously in relation to FIG. 8.

The method 400 comprises the step 420 of transmitting the mathematical model (generated at step 415) to the mathematical solver 13. Step 420 is executed by the solver interface 313 (executed by the processing unit 110).

The method 400 comprises the step 425 of processing the mathematical model (transmitted at step 420) to generate a mathematical solution. Step 425 is performed by the mathematical solver 13.

The method 400 comprises the step 430 of receiving the mathematical solution (generated at step 425) from the mathematical solver 13. Step 430 is executed by the solver interface 313 (executed by the processing unit 110).

In the implementation illustrated in FIG. 6A, where the mathematical solver 13 is executed by the computational server 10, the mathematical model is transmitted (step 420) via the communication interface 330 of the management platform 300 to the computational server 10 where the mathematical solver 13 is executed. Step 425 is performed by a processing unit (not represented in FIG. 6A for simplification purposes) of the computational server 10. The mathematical solution is received (step 430) via the communication interface 330 of the management platform 300 from the computational server 10. The computational server 10 has a communication interface (not represented in FIG. 6A for simplification purposes) for receiving the mathematical model from the management platform 300 and transmitting the mathematical solution to the management platform 300.

In the implementation illustrated in FIG. 6B, where the mathematical solver 13 is executed by the processing unit 310 of the management platform 300, steps 420, 425 and 430 are all executed by the processing unit 310.

As mentioned previously, the mathematical solution may comprise an availability metric (e.g. a percentage). The availability metric indicates if a complete (100%) mathematical solution has been found (e.g. all campaign constraints and all campaign goals are met), a partial (between 0% and 100%) mathematical solution has been found (e.g. all campaign constraints are met but a candidate campaign goal is not met), and no (0%) mathematical solution has been found (e.g. at least one campaign constraint is not met).

The following steps of the method 400 address the situation where a complete mathematical solution has been found (availability metric at 100%). In the case where no mathematical solution is found (availability of 0%), the candidate campaign is withdrawn upon approval of the customer. Alternatively, the requirements of the candidate campaign may be modified by the customer and the method 400 is re-applied to the modified candidate campaign. Optionally, a partial mathematical solution may be found and accepted by the customer and the candidate campaign booked, even if a candidate campaign goal is not met (e.g. only 90% of a goal of 1 million impressions can be achieved). The decision to accept a partial mathematical solution depends on the type of candidate campaign goal which is not met and may be configured at the management platform 300 (e.g. acceptable for a number of impressions goal or a number of plays goal, but not acceptable for SOV types of goals).

The method 400 comprises the step 435 of deploying the candidate campaign based on the mathematical solution (received at step 430). The deployment includes generating configuration data for displaying a content of the candidate campaign on selected screens among the plurality of screens under the control of the management platform 300 in accordance with the mathematical solution. Step 435 is executed by the solver interface 313 (executed by the processing unit 110).

Examples of configuration data comprise configuration of the selected screens for displaying the content, the time periods (e.g. everyday between 8 am and 6 pm) at which the content is displayed at a given screen among the selected screens, the PPL value for a given time period (e.g. Monday between 8 am and 6 pm) at a given screen among the selected screens, the number of plays for a given time period (e.g. Monday between 8 am and 6 pm) at a given screen (in this case, the PPL is not fixed and is adapted to accommodate the number of plays) among the selected screens, etc. The configuration data are also referred to as playout instructions in the digital signage industry.

The method 400 comprises the step 440 of updating the screen activity data based on the configuration data (generated at step 435) of the candidate campaign. Step 440 is executed by the campaign manager 312 (executed by the processing unit 110).

The method 400 comprises the step 445 of transmitting via the communication interface 330 one or more configuration command to computing devices controlling the display of content on the selected screens. The one or more configuration command is based on the configuration data (generated at step 435). Step 445 is executed by the screen manager 311 (executed by the processing unit 110).

Referring to FIGS. 6A and 6B, the computing devices controlling the display of content on the selected screens include at least one among the two digital signage servers 100 and the autonomous digital signage player 200.

Referring to FIGS. 6C and 6D, the computing devices controlling the display of content on the selected screens include at least one among the three digital signage players 200.

For each one of the selected screens, the corresponding configuration command(s) comprises at least one of the following: a unique identifier of the selected screen, the content and/or an identifier of the content to be displayed on the selected screen, the time periods (days and times) at which the content is played on the selected screen, a PPL number for a given time period, a number of plays for a given time period (alternatively to the PPL number), etc.

The method 400 comprises the step 450 of storing in the memory 320 the requirements of the candidate campaign.

The method 400 comprises the optional step 455 of generating reconfiguration data for at least one of the active campaigns based on the mathematical solution (received at step 430). The reconfiguration data define a modified configuration for at least one of the active campaign on selected screens among the plurality of screens under the control of the management platform 300. Step 455 is executed by the solver interface 313 (executed by the processing unit 110).

This optional step illustrates the optimization capability allowing the reconfiguration of one or more active campaign to accommodate a candidate campaign. Although not represented in FIG. 9B for simplification purposes, steps 440 and 445 are also performed for the at least one of the active campaigns mentioned at step 455.

The optional step 455 is performed when the candidate campaign and the active campaigns comprise a goal of the following type: total number of impressions for a given period of time, total number of plays for a given period of time, total budget for a given period of time, PPL value for a given period of time, SOV (fixed SOV, takeover SOV or average SOV) for a given period of time, etc.

In the following paragraphs, use cases are detailed for which the usage of the method 400, and more specifically the solver interface 313 and mathematical solver 13, provides improvements over the usage of a legacy availability engine. In some cases, a legacy availability engine cannot support the specific use case in question. In other cases, the usage of the method 400 eliminates or at least diminishes the need for manual adjustments to active campaigns and/or to the candidate campaign. In most cases, the processing power provided by the computational server 10 and the usage of the dedicated mathematical solver 13 (which is specifically designed to solve complex optimization problems) allow to process more complex use cases in a more efficient manner (e.g. less time is needed to find a solution). Consequently, the management platform 300 can be implemented by a lightweight computing device (requiring less processing power and/or less memory), since the heavy computational burden is delegated to the computational server 10 executing the mathematical solver 13, as illustrated in FIG. 6A. The computational server 10 can be further integrated in a cloud infrastructure, providing additional services such as load balancing, redundancy, etc. Additionally, the usage of the solver interface 313 allows to more easily support new use cases, by contrast to a legacy availability engine not using a mathematical solver 13.

Dynamic Campaign Rebalancing

Reference is now made concurrently to FIGS. 6A, 9A, 9B, 10A, 10B, 10C and 10D, where FIGS. 10A, 10B, 10C and 10D illustrate the capability of the method 400 to perform dynamic campaign rebalancing. More specifically, the configuration of at least one active campaign is reconfigured to accommodate a candidate campaign.

In the example illustrated in the Figures, five screens are considered, each screen providing a maximum number of impressions of one million impressions for a given period of time (e.g. for a given day or for a given time interval within a given day).

A first active campaign (referred to as campaign A) is already configured for execution on screens 1 and 2. One campaign goal of campaign A is to have 1 million impressions in total split between screens 1 and 2. The current configuration harmoniously splits the impressions at 0.5 million impressions on each screen (1 and 2).

A second active campaign (referred to as campaign B) is already configured for execution on screens 3, 4 and 5. One campaign goal of campaign B is to have 1.5 millions impressions in total split between screens 3, 4 and 5. The current configuration harmoniously splits the impressions at 0.5 million impressions on each screen (3, 4 and 5).

Figure 10B:
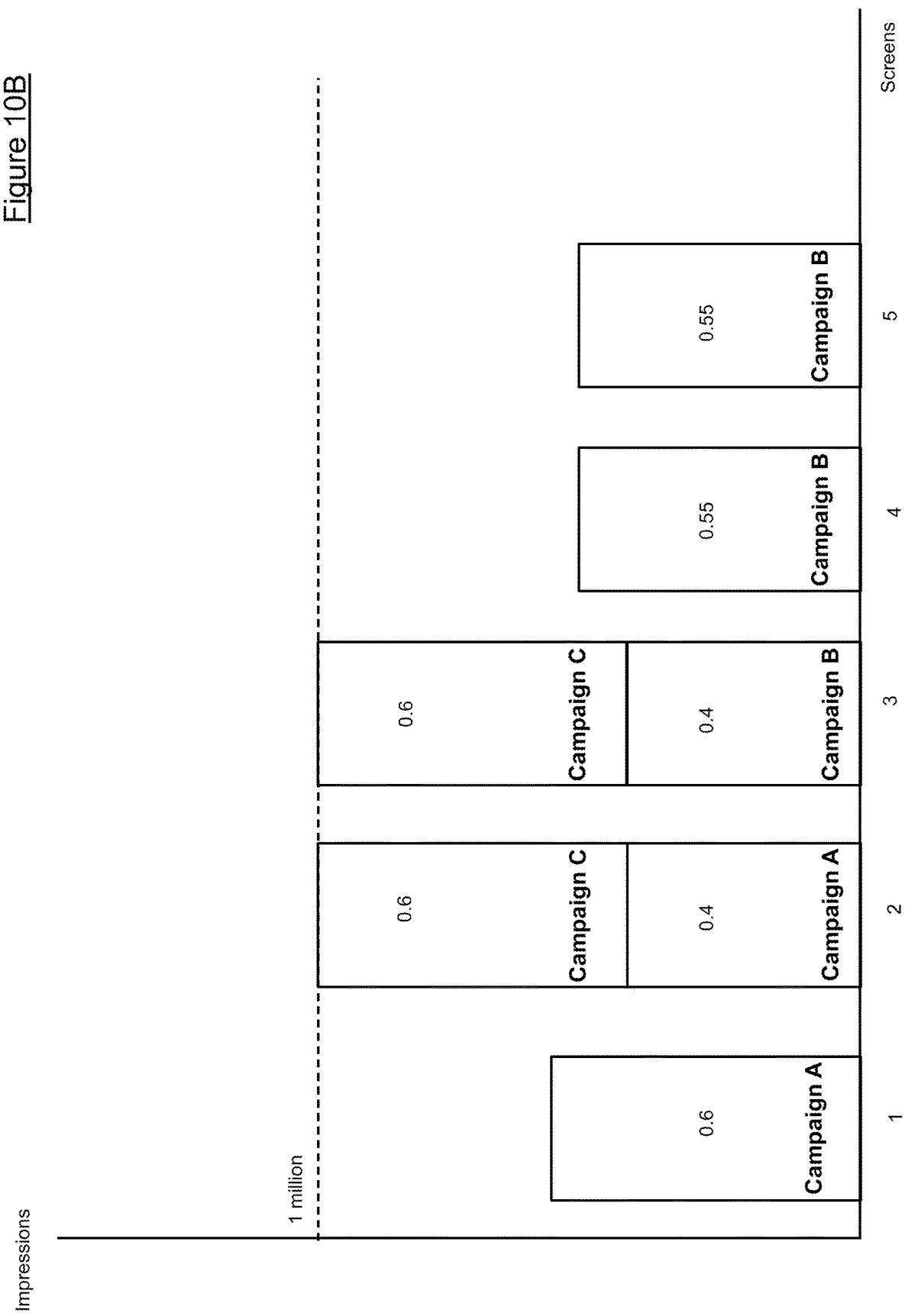

A candidate campaign (referred to as campaign C) is processed by the method 400. One campaign goal of campaign C is to have 1.2 millions impressions in total split between screens 2 and 3. As illustrated in FIG. 10A, candidate campaign C does not fit unless active campaigns A and B are reconfigured. The result of the reconfiguration (performed by the method 400) is illustrated in FIG. 10B.

For campaign A, the reconfiguration consists in having 0.6 million impressions on screen 1 and 0.4 million impressions on screen 2. Thus, the goal in terms of total impressions for campaign A (1 million) is respected.

For campaign B, the reconfiguration consists in having 0.4 million impressions on screen 3, 0.55 million impressions on screen 4 and 0.55 million impressions on screen 5. Thus, the goal in terms of total impressions for campaign B (1.5 millions) is respected.

For campaign C, the configuration consists in having 0.6 million impressions on screen 2 and 0.6 million impressions on screen 3. Thus, the goal in terms of total impressions for campaign C (1.2 millions) is respected. Campaign C is accepted and can be deployed as an active campaign.

FIG. 10C illustrates a new alternative with the previously described campaigns A, B and C; and a third active campaign. The third active campaign (referred to as campaign D) is configured to be executed on screens 4, 5 and 6. One campaign goal of campaign D is to have 1.5 millions impressions in total split between screens 4, 5 and 6. The current configuration harmoniously splits the impressions at 0.5 million impressions on each screen (4, 5 and 6).

Figure 10D:
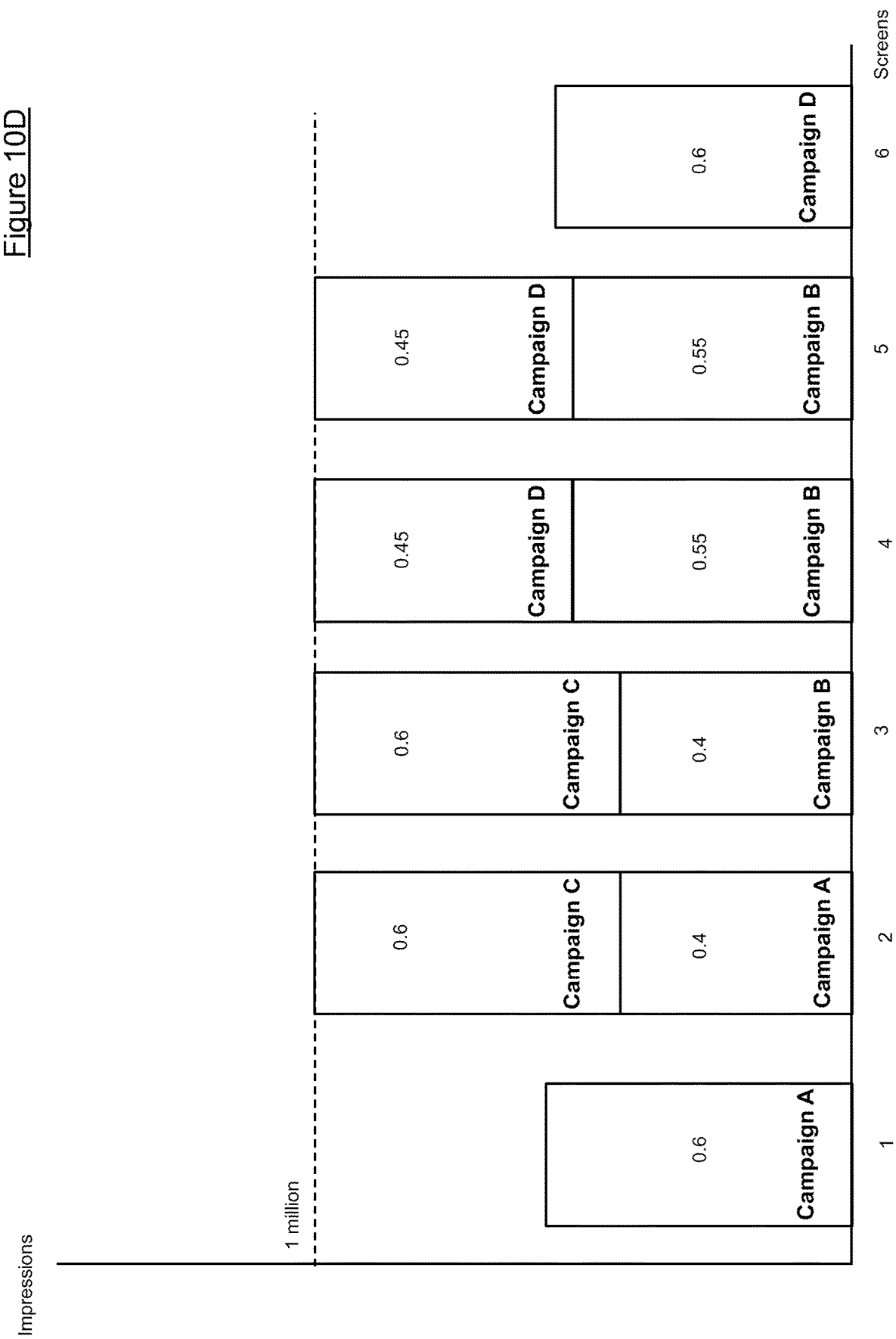

As illustrated in FIG. 10C, candidate campaign C does not fit unless active campaigns A, B and D are reconfigured. The result of the reconfiguration (performed by the method 400) is illustrated in FIG. 10D.

For campaign A, the reconfiguration consists in having 0.6 million impressions on screen 1 and 0.4 million impressions on screen 2. Thus, the goal in terms of total impressions for campaign A (1 million) is respected.

For campaign B, the reconfiguration consists in having 0.4 million impressions on screen 3, 0.55 million impressions on screen 4 and 0.55 million impressions on screen 5. Thus, the goal in terms of total impressions for campaign B (1.5 millions) is respected.

For campaign D, the reconfiguration consists in having 0.45 million impressions on screen 4, 0.45 million impressions on screen 5 and 0.6 million impressions on screen 6. Thus, the goal in terms of total impressions for campaign D (1.5 millions) is respected.

For campaign C, the configuration consists in having 0.6 million impressions on screen 2 and 0.6 million impressions on screen 3. Thus, the goal in terms of total impressions for campaign C (1.2 millions) is respected. Campaign C is accepted and can be deployed as an active campaign.

The aforementioned example is not limited to a total number of impressions for a given period of time and can be generalized to other types of goals. For example, the same mechanism (dynamic campaign rebalancing) applies for a goal (of the candidate campaign and the active campaigns) consisting of a total number of plays or a total budget for a given period of time, a PPL goal for a given period of time, a SOV goal (fixed SOV, takeover SOV or average SOV) for a given period of time.

Dynamic Campaign Auto-Rebalancing

Figure 11A:
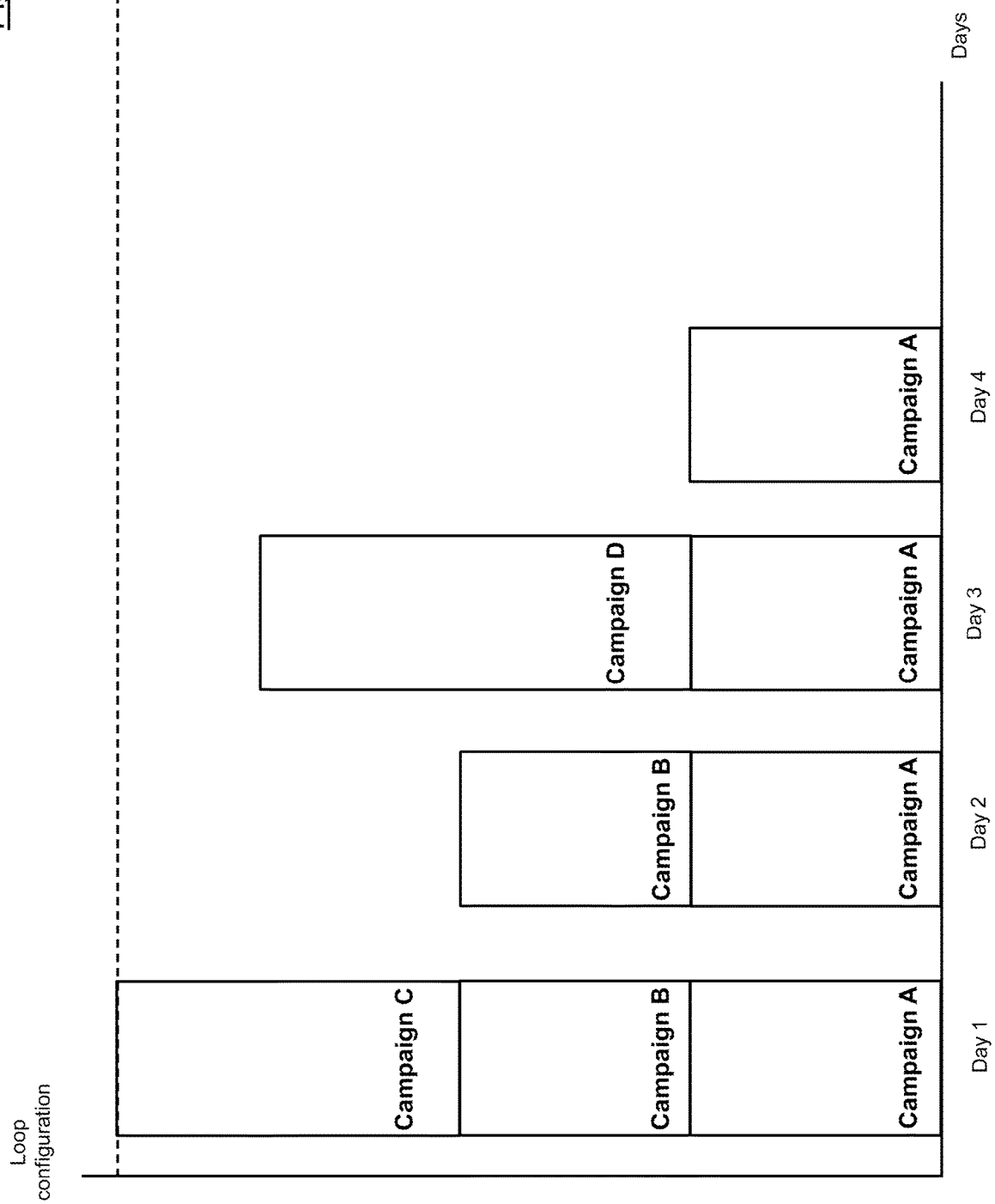
FIGS. 11A and 11B illustrate a dynamic campaign rebalancing functionality.
Figure 11B:
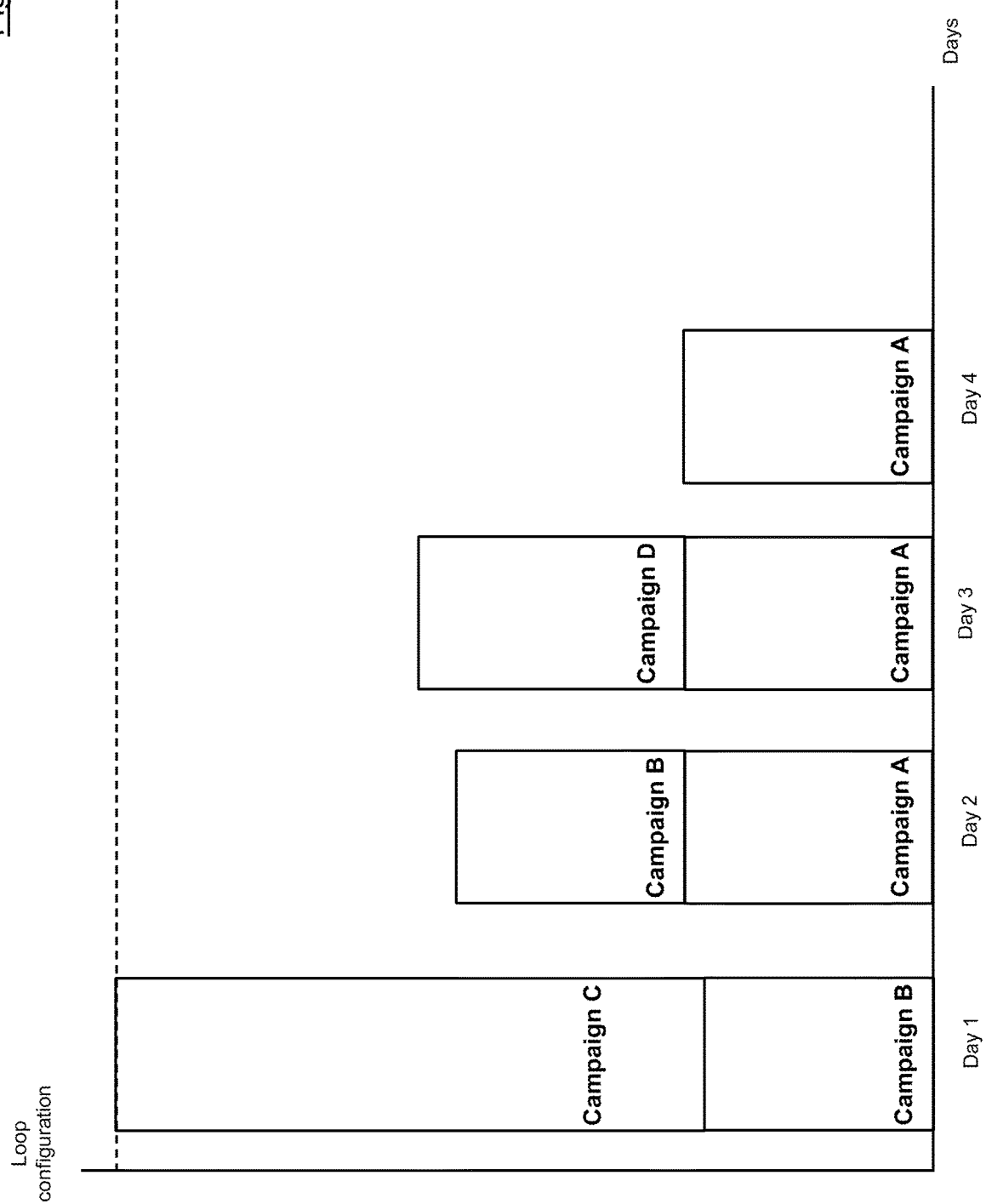

Reference is now made concurrently to FIGS. 6A, 9A, 9B, 11A and 11B, where FIGS. 11A and 11B illustrate the capability of the method 400 to perform dynamic campaign auto-rebalancing. More specifically, the reconfiguration of active campaigns compensates for at least one active campaign which has been underperforming or overperforming.

The performances of active campaigns are tracked regularly, and a given active campaign with performances not being within pre-defined thresholds is flagged as being underperforming or overperforming. Performance tracking and rebalancing may be for example performed every night for all the screens under the control of the management platform 300.

For example, considering an active campaign lasting seven days with a target number of impressions for the seven days (e.g. 7 millions impressions). The active campaign is assigned by the campaign manager 312 a goal each day (e.g. 1 million impressions on day 1, 2 millions impressions on day 2, 3 millions impressions on day 3, etc.) derived from the goal for the seven days. Upper and lower thresholds are also defined (e.g. 10% for each).

The performance of the active campaign is evaluated at the end of each day by the screen manager 311, based on the assigned goal of the day and the defined thresholds. For example, at the end of day 4, the assigned number of impressions for the first 4 days is 4 millions. If the actual number of impressions is below 3.6 millions, the campaign is considered to be underperforming. If the actual number of impressions is above 4.4 millions, the campaign is considered to be overperforming. If the actual number of impressions is between 3.6 and 4.4 millions, the campaign is considered to be on track.

Examples of reasons why an active campaign is underperforming include screen(s) where the campaign is deployed being down, connectivity issues with screen(s) where the campaign is deployed (a reporting on the execution of the campaign is not transmitted to the management platform 300), errors in the configuration of screen(s) where the campaign is deployed, etc. Examples of reasons why an active campaign is overperforming include errors in the configuration of screen(s) where the campaign is deployed, overplaying of the campaign to fill spare time in the loop of screen(s) where the campaign is deployed etc.

When an active campaign underperforming or overperforming with respect to a goal of the campaign (e.g. number of impressions) is detected, the goal is adjusted by the campaign manager 312, accordingly for the rest of the duration of the campaign (e.g. the number of impressions is increased if the campaign is underperforming and the number of impressions is decreased if the campaign is overperforming). Then, the underperforming or overperforming campaign is processed by the method 400 as if it was a candidate campaign for the rest of the duration of the campaign, with the requirements of the candidate campaign comprising the adjusted goal and the other requirements of the candidate campaign being unchanged (e.g. constraint(s) of the candidate campaign are unchanged).

In the case where priorities are allocated to the various campaigns, the following is applied: a campaign with the same or a higher priority cannot be negatively affected by another campaign (negatively affected meaning relinquishing some space to make room for the other campaign).

The performance of the following campaign goals is taken into consideration for identifying underperforming and overperforming campaigns (and performing dynamic campaign rebalancing): number of impressions, number of plays, PPL, fixed SOV, average SOV, etc.

Following is an example of dynamic campaign auto-rebalancing affecting the loop of a given screen over four consecutive days. FIG. 11A illustrates the current configuration of four campaigns (campaigns A, B, C and D) over the four consecutive days (day 1, 2, 3 and 4), representing the respective shares of the loop of the four campaigns. The share of the loop is directly correlated to the achievement of any of the aforementioned goals (number of impressions, number of plays, PPL, fixed SOV, average SOV, etc.). Campaigns B, C and D have the same priority P1, which is higher than the priority P2 of campaign A.

It has been determined that campaign C is underperforming while campaign D is overperforming. Therefore, the goal of campaign C is increased for days 1 to 4 and the goal of campaign D is decreased for days 1 to 4. Consequently, the processing by the method 400 of campaigns D and C as candidate campaigns for days 1 to 4 with adjusted campaign goals (increased for campaign C and decreased for campaign D) results in the adjustment to the loop configuration for days 1 to 4 as illustrated in FIG. 11B.

For day 1, campaign A has relinquished its space to campaign C (to compensate the underperformance of campaign C), while campaign B is unaffected. For day 2, no changes to the configuration occur. For day 3, campaign D relinquishes some space (to compensate the overperformance of campaign D) while campaign A is unaffected. For day 4, no changes to the configuration occur.

The dynamic campaign auto-rebalancing functionality improves the operations of the digital signage infrastructure under the control of the management platform 300, by compensating the effects on the performances of the campaigns of hardware failures (e.g. of the digital signage players 200 or digital signage servers 100 controlling display of content on the screens), networking failures (of the networking infrastructure connecting the management platform 300 to the digital signage players 200 and digital signage servers 100), human errors (e.g. misconfigurations of the screen schedules), etc.

Dynamic Screen Selection

Reference is now made concurrently to FIGS. 6A, 9A, 9B, 12A, 12B and 12C, where FIGS. 12A, 12B and 12C illustrate the capability of the method 400 to perform dynamic screen selection. More specifically, the configuration of at least one already active campaign is modified to accommodate a candidate campaign based on flexible screen constraints.

A flexible screen constraint consists in defining a set of screens with target location characteristics (e.g. target city, target type of venue, combination thereof, etc.) for a campaign, the set of screens comprising M screens in total. The flexible screen constraint further consists in defining a number N of screens, where N is lower than M. Over a reference period of time (e.g. several consecutive days), the campaign need to be deployed on N screens among the M screens. Any subset of N screens among the M screens is a valid selection.

In the example illustrated in the Figures, six locations are considered: a street in New York (NY), a mall in NY, a café in NY, a café in Boston (BOS), a mall in BOS and a park in BOS. A configuration period of five days with a granularity at the day level (Monday to Friday) is considered.

As illustrated in FIG. 12A, a first active campaign (referred to as campaign A) is already deployed with a flexible screen constraint consisting of 2 screens in NY from Monday to Friday. The campaign is deployed on screens NY street and NY mall from Monday to Friday.

A second active campaign (referred to as campaign B) is already deployed with a flexible screen constraint consisting of 2 screens in BOS from Monday to Friday. The campaign is deployed on screens BOS café and BOS mall from Monday to Friday.

A first candidate campaign (referred to as campaign C) is processed by the method 400. Campaign C has a flexible screen constraint consisting of 2 cafés from Tuesday to Wednesday. As illustrated in FIG. 12A, candidate campaign C does not fit unless already active campaigns A and B are reconfigured. The result of the reconfiguration (performed by the method 400) is illustrated in FIG. 12B.

There is no reconfiguration for campaign A. For campaign B, the reconfiguration consists in moving campaign B from the screen BOS café to the screen BOS park from Tuesday to Wednesday.

For campaign C, the configuration consists in selecting the screens NY café and BOS café from Tuesday to Wednesday. Campaign C can be deployed as an active campaign.

A second candidate campaign (referred to as campaign D) is processed by the method 400. Campaign D has a flexible screen constraint consisting of 2 malls from Thursday to Friday. As illustrated in FIG. 12B, candidate campaign D does not fit unless active campaigns A, B and C are reconfigured. The result of the reconfiguration (performed by the method 400) is illustrated in FIG. 12C.

For campaign A, the reconfiguration consists in moving campaign A from the screen NY mall to the screen NY café from Thursday to Friday.

For campaign B, the reconfiguration consists in moving campaign B from the screen BOS mall to the screen BOS park from Thursday to Friday. There is no reconfiguration for campaign C.

For campaign D, the configuration consists in selecting the screen NY mall and the screen BOS mall from Thursday to Friday. Campaign D can be deployed as an active campaign.

The flexible screen constraints are used in combination with various types of goals, such as PPV, SOV (fixed SOV, takeover SOV or average SOV), etc. There are greater chances to find a mathematical solution accommodating a candidate campaign with flexible screen constraints along with a given goal (e.g. PPV or SOV) than a candidate campaign with non-flexible screen constraints along with the same goal. Similarly, there are greater chances to find a mathematical solution accommodating a candidate campaign if at least some of the active campaigns have flexible screen constraints.

Other types of dynamic screen selection capabilities may be implemented through the method 400. For example, a dynamic range of screens is defined for the candidate campaign and/or for one or more of the active campaigns. A dynamic range of screens is defined by an average number of screens for a campaign (e.g. 25), along with a minimum (e.g. 20) and a maximum (e.g. 40) number of screens for the campaign. The dynamic range of screens provides some flexibility for accommodating a candidate campaign in view of active campaigns. The dynamic range of screens also provides some flexibility for reconfiguring an active campaign to accommodate a candidate campaign.

Minimum and Maximum Limiters

Reference is now made concurrently to FIGS. 6A, 9A and 9B. Following is an example where limiters apply to an average SOV goal of a campaign. The average SOV goal is set, as well as minimum and maximum average SOV goals. A hierarchy of granularities with several levels is defined for the campaign. The average SOV goal applies to a given level in the hierarchy and the minimum and maximum average SOV goals apply to the level directly bellow the given level in the hierarchy. The following table illustrates the application of the limiters at different levels of a standard campaign hierarchy.

|  | Level 1 | Level 2 | Level 3 |
| --- | --- | --- | --- |
| Campaign | Average |  |  |
| Daily | Min/Max Limiters | Average |  |
| Daily per screen |  | Min/Max Limiters | Average |
| Fixed |  |  | Min/Max Limiters |

As illustrated, a campaign average SOV (e.g. 50%) is set and minimum (e.g. 40%) and maximum (e.g. 60%) daily average SOVs are set. Alternatively, a daily average SOV (e.g. 40%) is set and minimum (e.g. 35%) and maximum (e.g. 45%) daily average SOVs per screen are set. Alternatively, a daily average SOV per screen (e.g. 50%) is set and minimum (e.g. 45%) and maximum (e.g. 55%) fixed SOVs are set at any time for the day and screen in question.

The minimum and maximum limiters are taken into consideration by the solver interface 330 for the generation of the mathematical model. Consequently, the mathematical solution generated by the mathematical solver 13 takes into consideration the minimum and maximum limiters introduced in the mathematical model.

The same mechanism can be applied to other types of goals involving the definition of an average target metric. For example, an average PPL goal for a given level in the hierarchy is set, and minimum and maximum average PPL goals are set for the level directly below the given level in the hierarchy.

The present disclosure is not limited to the field of digital signage content and can be extended to any type of digital content. In particular, it can be extended to the field of digital broadcasting/digital streaming, where content is broadcasted/streamed to a user device (e.g. television, computer, tablet, smartphone, etc.). In this context, loops of advertisements are inserted into other types of content, in a manner similar to the loops of digital signage advertising displayed on digital signage players.

Referring to FIGS. 6A and 8, the functionalities of the mathematical solver 13 described previously may be complemented or replaced with other functionalities. For example, artificial intelligence functionalities (e.g in the form of one or more neural network) may be incorporated to the mathematical solver 13.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A computing device for performing dynamic digital signage campaign optimization, the computing device comprising:
at least one communication interface;
memory; and
a processing unit configured to:
store in the memory screen data associated to a plurality of screens under control of the computing device, the screen data comprising screen characteristic data defining characteristics of each screen under the control of the computing device, the screen data further comprising screen activity data for a plurality of active campaigns, the screen activity data comprising for each screen at least one of the following: time periods of content display at the screen for each active campaign, duration of the content displayed for each active campaign, number of repetitions in a loop of the screen for each active campaign, percentage of occupation of the loop of the screen for each active campaign, and percentage of occupation of the loop of the screen by the plurality of active campaigns;
store in the memory requirements of the plurality of active campaigns, the requirements of each active campaign comprising at least one campaign goal and at least one campaign constraint, the at least one campaign constraint comprising at least one of the following: a location of the screens used for the active campaign, a number of screens used for the active campaign, and time periods for performing the active campaign;
determine that a given active campaign is overperforming or underperforming with respect to a given campaign goal of the given active campaign, the plurality of active campaigns comprising the given active campaign and at least one other active campaign;
adjust the given campaign goal of the given active campaign;
update the requirements of the given active campaign with the adjusted given campaign goal;
generate a mathematical model based on the updated requirements of the given active campaign, the requirements of the at least one other active campaign, and at least some of the screen data;
transmit via the at least one communication interface the mathematical model to a computational server executing a mathematical solver;
receive via the at least one communication interface a mathematical solution generated by the mathematical solver from the computational server, the mathematical solver processing the mathematical model to generate the mathematical solution;
generate reconfiguration data for the given active campaign based on the mathematical solution, the reconfiguration data defining a new configuration for displaying a content of the given active campaign on selected screens among the plurality of screens under the control of the computing device;
update the screen activity data based on the reconfiguration data of the given active campaign; and
transmit via the at least one communication interface one or more configuration command to computing devices controlling the display of content on the selected screens, the one or more configuration command being based on the reconfiguration data.

2. The computing device of claim 1, wherein the processing unit is further configured to store in the memory the updated requirements of the given active campaign.

3. The computing device of claim 1, where the processing unit is further configured to generate reconfiguration data for one among the at least one other active campaign based on the mathematical solution, the reconfiguration data defining a new configuration for displaying a content of the one among the at least one other active campaign on selected screens among the plurality of screens under the control of the computing device.

4. The computing device of claim 3, where the processing unit is further configured to update the screen activity data based on the reconfiguration data of the one among the at least one other active campaign.

5. The computing device of claim 3, where the processing unit is further configured to transmit via the at least one communication interface one or more configuration command to computing devices controlling the display of content on the selected screens, the one or more configuration command being based on the reconfiguration data of the one among the at least one other active campaign.

6. The computing device of claim 1, wherein the screen characteristic data comprise at least one of the following: a schedule of the screen, a duration of a loop of content displayed at the screen, a number of impressions per unit of time for the screen, a cost for displaying content at the screen, a location of the screen, and a geometry of the screen.

7. The computing device of claim 1, wherein the at least one campaign goal comprises at least one of the following: a play per loop (PPL) goal, a fixed Share Of Voice (SOV) goal, a takeover SOV goal, an average SOV goal, a number of impressions goal, and a number of plays goal.

8. The computing device of claim 1, wherein the reconfiguration data for the given active campaign comprise at least one of the following: the selected screens for displaying the content of the given active campaign, time periods at which the content is displayed at a given screen among the selected screens, a play per loop (PPL) value for a given time period at a given screen among the selected screens, and a number of plays for a given time period at a given screen among the selected screens.

9. The computing device of claim 1, wherein the mathematical solution comprises an availability metric indicating if a complete mathematical solution has been found, a partial mathematical solution has been found or no mathematical solution has been found.

10. The computing device of claim 9, wherein the availability metric indicating that a partial mathematical solution has been found comprises a percentage of achievement of a campaign goal, the campaign goal being one of the requirements of the given active campaign.

11. A computing device for performing dynamic digital signage campaign optimization, the computing device comprising:
at least one communication interface;
memory; and
a processing unit configured to:
store in the memory screen data associated to a plurality of screens under control of the computing device, the screen data comprising screen characteristic data defining characteristics of each screen under the control of the computing device, the screen data further comprising screen activity data for a plurality of active campaigns, the screen activity data comprising for each screen at least one of the following: time periods of content display at the screen for each active campaign, duration of the content displayed for each active campaign, number of repetitions in a loop of the screen for each active campaign, percentage of occupation of the loop of the screen for each active campaign, and percentage of occupation of the loop of the screen by the plurality of active campaigns;

store in the memory requirements of the plurality of active campaigns, the requirements of each active campaign comprising at least one campaign goal and at least one campaign constraint, the at least one campaign constraint comprising at least one of the following: a location of the screens used for the active campaign, a number of screens used for the active campaign, and time periods for performing the active campaign;

determine that a given active campaign is overperforming or underperforming with respect to a given campaign goal of the given active campaign, the plurality of active campaigns comprising the given active campaign and at least one other active campaign;

adjust the given campaign goal of the given active campaign;

update the requirements of the given active campaign with the adjusted given campaign goal;

generate a mathematical model based on the updated requirements of the given active campaign, the requirements of the at least one other active campaign, and at least some of the screen data;

process by a mathematical solver the mathematical model to generate a mathematical solution;

generate reconfiguration data for the given active campaign based on the mathematical solution, the reconfiguration data defining a new configuration for displaying a content of the given active campaign on selected screens among the plurality of screens under the control of the computing device;

update the screen activity data based on the reconfiguration data of the given active campaign; and transmit via the at least one communication interface one or more configuration command to computing devices controlling the display of content on the selected screens, the one or more configuration command being based on the reconfiguration data.

12. The computing device of claim 11, wherein the processing unit is further configured to store in the memory the updated requirements of the given active campaign.

13. The computing device of claim 11, where the processing unit is further configured to generate reconfiguration data for one among the at least one other active campaign based on the mathematical solution, the reconfiguration data defining a new configuration for displaying a content of the one among the at least one other active campaign on selected screens among the plurality of screens under the control of the computing device.

14. The computing device of claim 13, where the processing unit is further configured to update the screen activity data based on the reconfiguration data of the one among the at least one other active campaign.

15. The computing device of claim 13, where the processing unit is further configured to transmit via the at least one communication interface one or more configuration command to computing devices controlling the display of content on the selected screens, the one or more configuration command being based on the reconfiguration data of the one among the at least one other active campaign.

16. The computing device of claim 11, wherein the screen characteristic data comprise at least one of the following: a schedule of the screen, a duration of a loop of content displayed at the screen, a number of impressions per unit of time for the screen, a cost for displaying content at the screen, a location of the screen, and a geometry of the screen.

17. The computing device of claim 11, wherein the at least one campaign goal comprises at least one of the following: a play per loop (PPL) goal, a fixed Share Of Voice (SOV) goal, a takeover SOV goal, an average SOV goal, a number of impressions goal, and a number of plays goal.

18. The computing device of claim 11, wherein the reconfiguration data for the given active campaign comprise at least one of the following: the selected screens for displaying the content of the given active campaign, time periods at which the content is displayed at a given screen among the selected screens, a play per loop (PPL) value for a given time period at a given screen among the selected screens, and a number of plays for a given time period at a given screen among the selected screens.

19. The computing device of claim 11, wherein the mathematical solution comprises an availability metric indicating if a complete mathematical solution has been found, a partial mathematical solution has been found or no mathematical solution has been found.

20. The computing device of claim 19, wherein the availability metric indicating that a partial mathematical solution has been found comprises a percentage of achievement of a campaign goal, the campaign goal being one of the requirements of the given active campaign.

* * * * *